(12) United States Patent
Kobayashi et al.

(10) Patent No.: US 8,699,843 B2
(45) Date of Patent: Apr. 15, 2014

(54) OPTICAL FIBER RIBBON HOLDING MEMBER, OPTICAL FIBER RIBBON HOLDING METHOD, AND OPTICAL FIBER RIBBON BUNDLE

(75) Inventors: Terutake Kobayashi, Tokyo (JP); Kunihiko Fujiwara, Tokyo (JP); Tetsuo Nozawa, Tokyo (JP)

(73) Assignee: Fujikura Ltd., Tokyo (JP)

(*) Notice: Subject to any disclaimer, the term of this patent is extended or adjusted under 35 U.S.C. 154(b) by 690 days.

(21) Appl. No.: 13/020,351

(22) Filed: Feb. 3, 2011

(65) Prior Publication Data

US 2011/0229100 A1 Sep. 22, 2011

Related U.S. Application Data

(60) Provisional application No. 61/300,998, filed on Feb. 3, 2010, provisional application No. 61/334,002, filed on May 12, 2010.

(51) Int. Cl.
*G02B 6/00* (2006.01)

(52) U.S. Cl.
USPC ........... 385/137; 385/134; 385/136; 385/138; 385/139

(58) Field of Classification Search
USPC .......................... 385/134, 136, 137, 138, 139
See application file for complete search history.

(56) References Cited

U.S. PATENT DOCUMENTS

| | | | |
|---|---|---|---|
| 6,091,875 A * | 7/2000 | Lindsay et al. | 385/134 |
| 7,546,020 B2 * | 6/2009 | Honma | 385/137 |

FOREIGN PATENT DOCUMENTS

| | | | |
|---|---|---|---|
| JP | 10-133050 A | 5/1998 |
| JP | 2000-321466 A | 11/2000 |
| JP | 2001-148584 A | 5/2001 |
| JP | 2009-186833 A | 8/2009 |

OTHER PUBLICATIONS

International Search Report of PCT/JP2011/052266, mailing date Mar. 1, 2011.
Notice of Allowance dated Apr. 2, 2013, issued in corresponding Japanese Patent Application No. 2011-552823, with English translation (6 pages).

* cited by examiner

*Primary Examiner* — Jennifer Doan
(74) *Attorney, Agent, or Firm* — Westerman, Hattori, Daniels & Adrian, LLP

(57) ABSTRACT

Provided with a holding member main body having an upward U-shaped cross section and having a space to which a plurality of optical fiber ribbons can be accommodated in a laminated state; and a lid body having a downward U-shaped cross section, wherein latch structures that engage to each other when lid body covers holding member main body are provided at wall portions of lid body and holding member main body, the lid body includes an optical fiber ribbon pressing portion that presses the laminated optical fiber ribbons accommodated in holding member main body. Heating operation is not required unlike a heat shrinkable tube, and the optical fiber ribbons are held by only a simple operation of covering the lid body, so that the operation of holding the optical fiber ribbons in a laminated state is easily performed and readjustment of the position of the optical fiber ribbons in a longitudinal direction can be performed.

22 Claims, 38 Drawing Sheets

OPTICAL FIBER RIBBON HOLDING MEMBER, OPTICAL FIBER RIBBON HOLDING METHOD, AND OPTICAL FIBER RIBBON BUNDLE

CROSS-REFERENCE TO RELATED APPLICATION

The present application is a non-provisional application, and claims priority to and the benefit of U.S. provisional application No. 61/300,998 filed in the United States of America on Feb. 3, 2010, and U.S. provisional application No. 61/334,002 filed in the United States of America on May 12, 2010. The entire contents of which are incorporated herein by reference.

BACKGROUND

1. Field of the Invention

The present invention relates to an optical fiber ribbon holding member that holds an optical fiber ribbon in which an optical connector mounted on a substrate is attached to a distal end thereof, and also relates to an optical fiber ribbon holding method and an optical fiber ribbon bundle.

More specifically, the present invention relates to an optical fiber ribbon holding member for holding a plurality of optical fiber ribbons, to an optical fiber ribbon holding method using the optical fiber ribbon holding member, and to an optical fiber ribbon bundle that is formed from a plurality of optical fiber ribbons which are held by the optical fiber ribbon holding member.

2. Description of the Related Art

For example, in the case where a plurality of optical fiber ribbons are held in a laminated state, conventionally, a heat shrinkable tube is used as the optical fiber ribbon holding member that holds the optical fiber ribbons (hereinafter referred to as the ribbons according to the case), in which an optic path change type optical connector, which is mounted on an photoelectric composite substrate, is attached to a distal end of the optical fiber ribbon.

In a case where the optical fiber ribbons are laminated and held by the heat shrinkable tube, when the heat shrinkable tube covers the laminated optical fiber ribbons and heated at a high temperature of 100 degree or more, the heat shrinkable tube is shrunk to tighten and hold the laminated optical fiber ribbons.

As described above, the optical fiber ribbons held by the heat shrinkable tube are fixed at a device bedplate side by fixing a part of the heat shrinkable tube with, for example, a holding member fixture for fixing the holding member that is fixed at the periphery portion of the device bedplate to which a photoelectric composite substrate are mounted.

Each optical connector mounted on the distal end of each ribbon must be positioned and arranged on the photoelectric composite substrate accurately. However when the position of the ribbon that is laminated and held by the heat shrinkable tube is misaligned in a longitudinal direction, the optical connector on the distal end of the misaligned ribbon is misaligned with the position to be mounted on the substrate. As a result, the accurate positioning and arrangement is no longer possible.

Once the heat shrinkable tube has been shrunk, the heat shrinkable tube cannot return to the configuration prior to shrinkage. Therefore, when the optical fiber ribbons are shipped as being held by the heat shrinkable tube at the time of shipping, there is a problem that a user cannot move and readjust the position of each of the optical fiber ribbons to the proper position.

Meanwhile, as described above, it is required to heat the heat shrinkable tube to a high temperature in order to hold the optical fiber ribbons by the heat shrinkable tube, so there is also a problem that the user who receives the product cannot easily perform the operation.

Accordingly, an optical fiber ribbon holding member is desired in which the heating operation by the user is not required and readjustment of the position of the optical fiber ribbons can be performed.

In addition, for example, while mounting an optical fiber ribbon to a distal end of which an optical path conversion element is amounted on a substrate such as a photoelectric composite substrate, a holding member may be used for holding the optical fiber ribbon to a distal end of which the optical path conversion element are mounted.

The holding member, for example includes a holding member main body that houses a plurality of optical fiber ribbons in a laminated state, and a lid body for covering the main body. The plurality of optical fiber ribbons are pressed by a pressing portion provided on the lid body, so that the optical fiber ribbons can be held without causing a misalignment.

However, in a conventional holding member, the optical fiber ribbons are pressed by the pressing portion of the lid body in order to held it, a considerable insertion loss is generated caused by the pressing.

SUMMARY

The present invention was conceived in view of the above described circumstances, and has the following objects.

(1) To provide an optical fiber ribbon holding member which can easily hold the optical fiber ribbons and a heating operation is not required, or the position of the optic fiber ribbons can be readjusted, when a plurality of optical fiber ribbons are held mainly in a laminated state.

(2) To enable improved reduction of insertion loss in the holding member.

An aspect of the present invention provides an optical fiber ribbon holding member that holds a plurality of optical fiber ribbons, in which an optical connector mounted on a substrate is attached to a distal end of each optical fiber ribbon, in a laminated state and in a state in which a position of an optical connector at a distal end of an optical fiber ribbon is misaligned in a longitudinal direction of a ribbon, and is fixed to a holding member fixture for fixing a holding member that is fixed to a device bedplate on which the substrate is attached, the optical fiber ribbon holding member may comprise a holding member main body that has an upward U-shaped cross section with a bottom portion and both sides wall portions, and has a space to which a plurality of optical fiber ribbons can be accommodated in a laminated state; and a lid body that has a downward U-shaped cross section with a top surface portion and both sides wall portions, and covers an open surface of the holding member main body having U-shaped cross section; wherein latch structures are provided on the wall portion of the lid body and the wall portion of the holding member main body, and an engaging click and an engaging recess engage to each other when a lid body covers a holding member main body; and the lid body includes an optical fiber ribbon pressing portion that presses the laminated optical fiber ribbons accommodated in the holding member main body.

The latch structure may include a two step latch structure including a first latch structure that engages the holding member main body and the lid body so that the accommodated optical fiber ribbons are slightly pressed by the optical fiber ribbon pressing portion, and a second latch structure that engages the holding member main body and the lid body so that the accommodated optical fiber ribbons are tightly pressed by the optical fiber ribbon pressing portion.

The optical fiber ribbon pressing portion in the optical fiber ribbon holding member may be formed from an elastic member provided on the top surface portion of the lid body.

The optical fiber ribbon pressing portion in the optical fiber ribbon holding member may have a structure in which the top surface portion of the lid body is configured as a plate spring shape.

Another aspect of the present invention provides an optical fiber ribbon holding member which may comprise a holding member main body that has an upward U-shaped cross section with a bottom portion and both sides wall portions, and has a space to which an optical fiber ribbon can be accommodated; and a lid body that has a downward U-shaped cross section with a top surface portion and both sides wall portions, and covers an open surface of the holding member main body having U-shaped cross section; wherein latch structures are provided on the wall portion of the lid body and the wall portion of the holding member main body, and an engaging click and an engaging recess engage to each other when a lid body covers a holding member main body; and the lid body includes an optical fiber ribbon pressing portion that presses the optical fiber ribbon accommodated in the holding member main body.

The other aspect of the present invention provides an optical fiber ribbon holding method for holding an optical fiber ribbon using the optical fiber ribbon holding member, the method may comprise interposing a soft rubber member between a lowermost optical fiber ribbon and a bottom portion of a holding member main body, between an uppermost optical fiber ribbon and a top surface portion of a lid body, and between optical fiber ribbons, when holding an optical fiber ribbon with the optical fiber ribbon holding member.

A rubber tube may cover an optical fiber ribbon as the rubber member.

The other aspect of the present invention provides an optical fiber ribbon bundle which may be formed from a plurality of optical fiber ribbons, in which each optical fiber ribbon has an optical connector mounted on a distal end thereof, and is held by the optical fiber ribbon holding member.

A soft rubber member may be interposed between a lowermost optical fiber ribbon and a bottom portion of the holding member main body, between an uppermost optical fiber ribbon and a top surface portion of a lid body, and between optical fiber ribbons, when holding an optical fiber ribbon with the optical fiber ribbon holding member.

A rubber tube may cover an optical fiber ribbon as the rubber member.

The optical fiber ribbon holding member according to the present invention may include a holding member main body having a bottom portion and a wall portions disposed upright from both side edges thereof, and accommodating a plurality of optical fiber ribbons therein; a lid body having a bottom portion and a wall portions disposed upright from both side edges thereof, and holding the plurality of optical fiber ribbons with the holding member main body by covering the holding member main body such that inner sides thereof are mutually opposed; and a pressure dispersion plate that is disposed between the lid body and the plurality of optical fiber ribbons for dispersing a pressure from the lid body.

The optical fiber ribbon holding member according to the present invention may be provided with a limiting structure for limiting mutual relative displacement and disposed on at least one of the pressure dispersion plate or the lid body.

The pressure dispersion plate may be mountable on the lid body.

The pressure dispersion plate may include a pressure dispersion plate main body and a side plate portion disposed upright from both side edges, a slit may be provided in the lid body to which the side plate portion of the pressure dispersion plate can be inserted, wherein the pressure dispersion plate brought into contact with an edge of the slit to thereby limit relative displacement between the pressure dispersion plate and the lid body.

The optical fiber ribbon holding member according to the present invention may provide an engagement portion on the side plate portion of the pressure dispersion plate, and enables engagement of the engagement portion with the lid body to thereby mount the pressure dispersion plate on the lid body.

The engagement portion of the pressure dispersion plate enables plastic bending deformation.

The engagement portion of the pressure dispersion plate enables elastic bending deformation.

The pressure dispersion plate enables an integrated and connected configuration with the lid body.

The optical fiber ribbon holding method according to the present invention uses an optical fiber ribbon holding member including a holding member main body that has a bottom portion and a wall portions disposed upright from both side edges thereof, and a lid body that has a bottom portion and a wall portions disposed upright from both side edges thereof, the method may include accommodating a plurality of optical fiber ribbons in an inner side of the holding member main body; disposing a pressure dispersion plate for dispersing a pressure from the lid body between the lid body and the plurality of optical fiber ribbons; and covering the holding member main body with the lid body by mutually opposing an inner sides to thereby hold the plurality of optical fiber ribbons with the holding member main body.

The optical fiber ribbon holding method according to the present invention may further includes covering each of the plurality of optical fiber ribbons with a rubber tube.

The optical fiber ribbon holding method according to the present invention may further include disposing the pressure dispersion plate between an optical fiber ribbon most proximate to the lid body side and a rubber tube covering this optical fiber ribbon.

An optical fiber ribbon bundle according to an aspect of the present invention may be formed from a plurality of optical fiber ribbons held by an optical fiber ribbon holding member.

In the optical fiber ribbon holding member according to the aspect of the present invention, when a plurality of optical fiber ribbons is laminated and accommodated in the holding member main body, and the lid body is applied and pressed in, the optical fiber ribbons can be held tightly without causing positional deviation, due to the function between the optical fiber ribbon pressing portion provided on the lid body and the latch structure.

In this manner, the optical fiber ribbons can be held by a simple operation of covering with the lid body, and therefore the operation of holding the optical fiber ribbons in a laminated configuration is simplified.

Furthermore, since the lid body can be easily removed to thereby the optical fiber ribbons can be rearranged. As a result, readjustment of the position of the optical fiber ribbons in the longitudinal is enabled.

Operational characteristics are facilitated due to the absence of a heating operation similar to that used in relation to the conventional heat shrinkable tube, and the position of the optical fiber ribbons can be readjusted with a detachable lid body. Therefore even when high accuracy positioning is not executed during shipping of components, a user can easily perform a positioning with a highly accurate, and thereby the optical fiber ribbons can be laminated and held.

According to the optical fiber ribbon holding member of the present invention, since a two step latch structure are provided, therefore readjustment of the position of the optical fiber ribbons can be achieved by releasing the second step latch structure and without removing the lid body that is engaged with the first step latch structure, and thereby the readjustment operation of the optical fiber ribbon is simplified.

The rubber member or the rubber tube in the optical fiber ribbon holding method according to the present invention has anti-slip function between the upper and lower inner surfaces of the optical fiber ribbon holding member and the optical fiber ribbon, and between the optical fiber ribbons, thereby prevention of a positional deviation of the optical fiber ribbon is effective.

Furthermore, the optical fiber ribbon bundle according to the present invention enables a considerable improvement in the operational performance by a user where a component to be shipped.

In the present invention, further improvement in reducing insertion loss is enabled by the optical fiber ribbon holding member that includes a pressure dispersion plate for dispersing pressure from the lid body between the lid body and the optical fiber ribbons.

DETAILED DESCRIPTION OF THE PREFERRED EMBODIMENTS

An optical fiber ribbon holding member, an optical fiber ribbon holding method and an optical fiber ribbon bundle according to the present invention will be described below making reference to the figures.

First Embodiment

Figure 1:
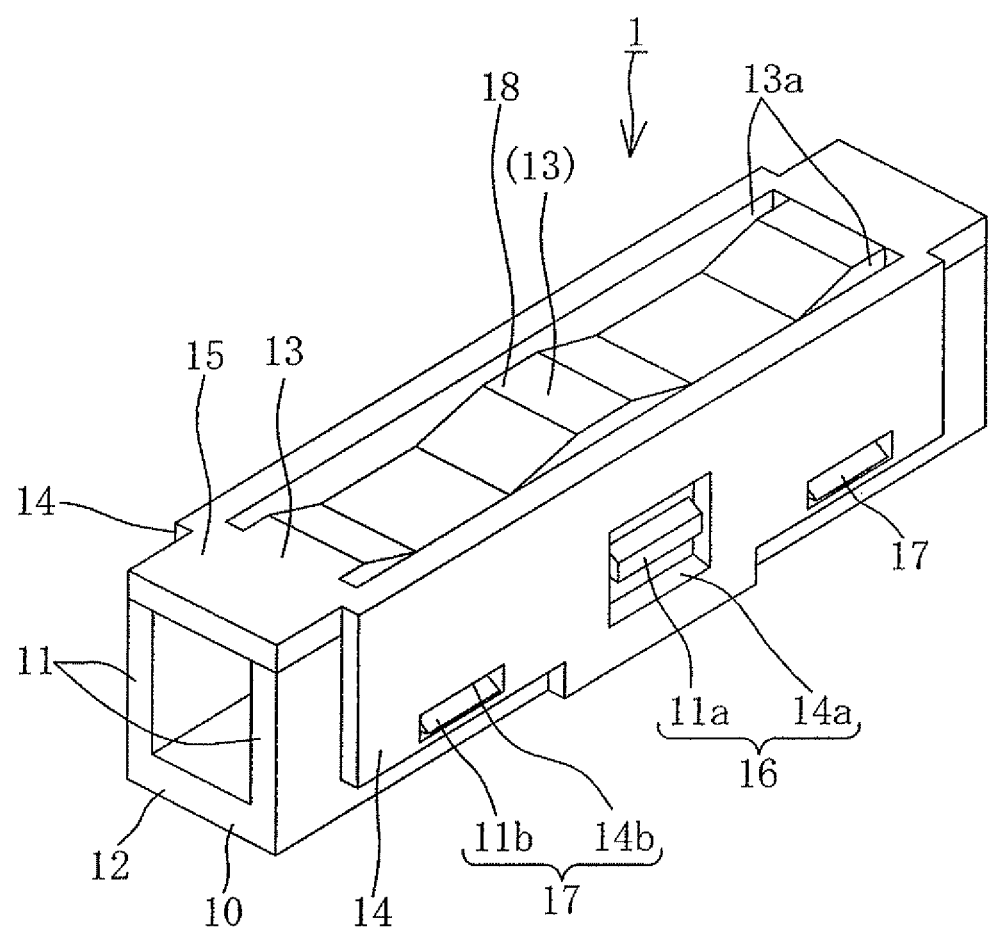
FIG. 1 is a perspective view showing a first embodiment of an optical fiber ribbon holding member according to the present invention.

FIG. 1 is a perspective view showing an optical fiber ribbon holding member 1 according to a first embodiment of the present invention.

Figure 7:
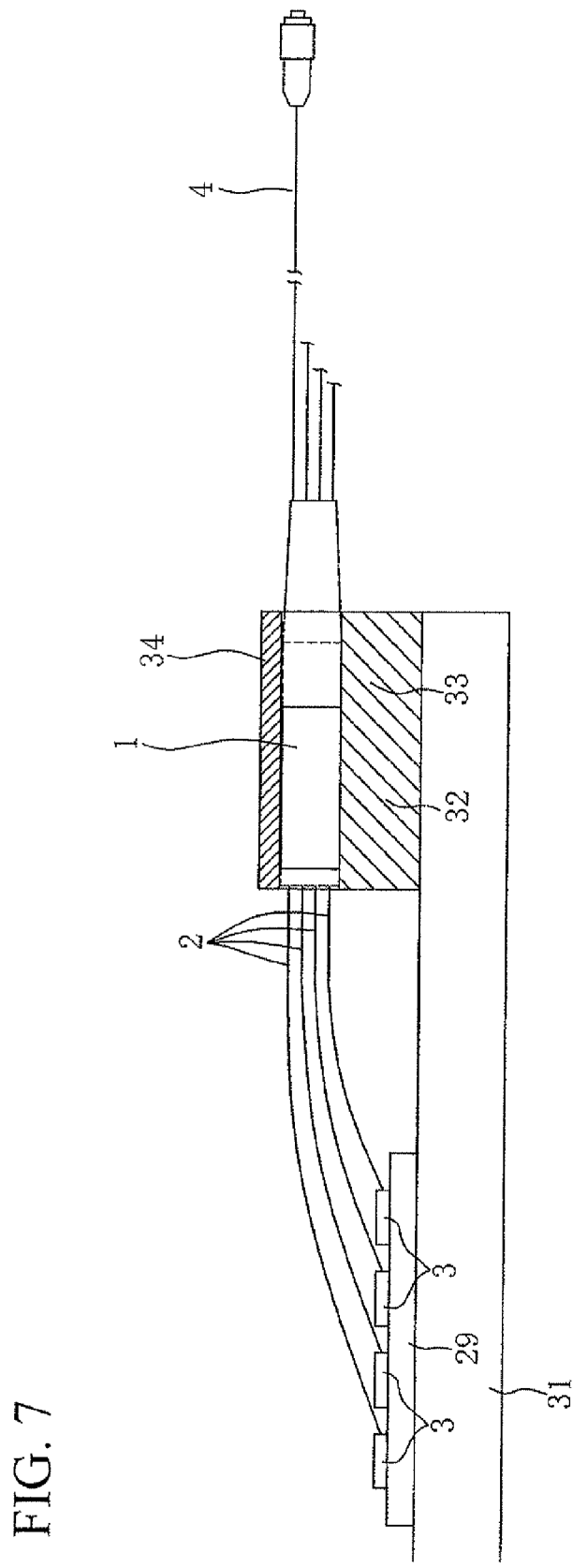
FIG. 7 is a view showing a state in which an optical fiber ribbon holding member that holds laminated ribbons are fixed by a holding member fixture for fixing a holding member that is fixed to a device base plate.

As shown in FIG. 7, an optical path change type optical connector 3, which is mounted on an photoelectric composite substrate 29 at a device bed plate 31 in a computer device and the like, is attached to a distal end of each of optical fiber ribbons (optical fiber tape core wires) 2. The optical fiber ribbon holding member 1 holds a plurality of the optical fiber ribbons 2 in a laminated state and in a state in which the positions of the optical connectors 3 at the distal ends of the optical fiber ribbons 2 are misaligned with each other in a length direction of the ribbon. The optical fiber ribbon holding member 1 is fixed in a holding member fixture 32 for fixing the holding member that is fixed in a peripheral portion of the device bedplate 31.

The optical connector 3 changes optical path and performs optical coupling between the optical fibers that are inputted parallel to the substrate 29 and optical elements (not shown) that are mounted on the surface of the substrate 29.

In this embodiment, a so-called MPO optical connector 4 is attached to the other end of each of the optical fiber ribbons 2. The reference numeral 33 is a base portion of a holding member fixture 32, and the reference numeral 34 is a lid portion. The base portion 33 of the holding part fixture 32 is fixed on the device bedplate 31 with bolts (not shown).

Figure 2A:
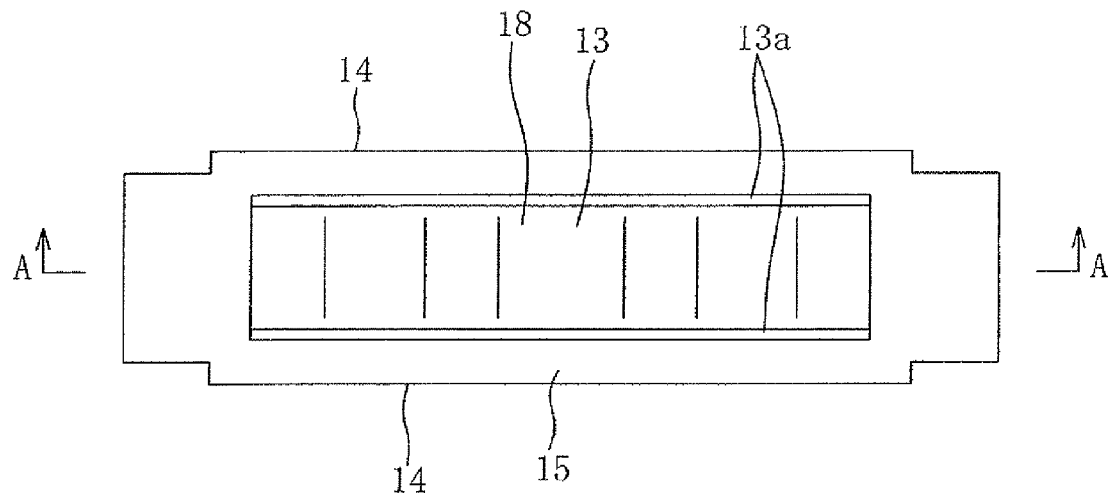
FIG. 2A is a plan view of the optical fiber ribbon holding member of FIG. 1.
Figure 2B:
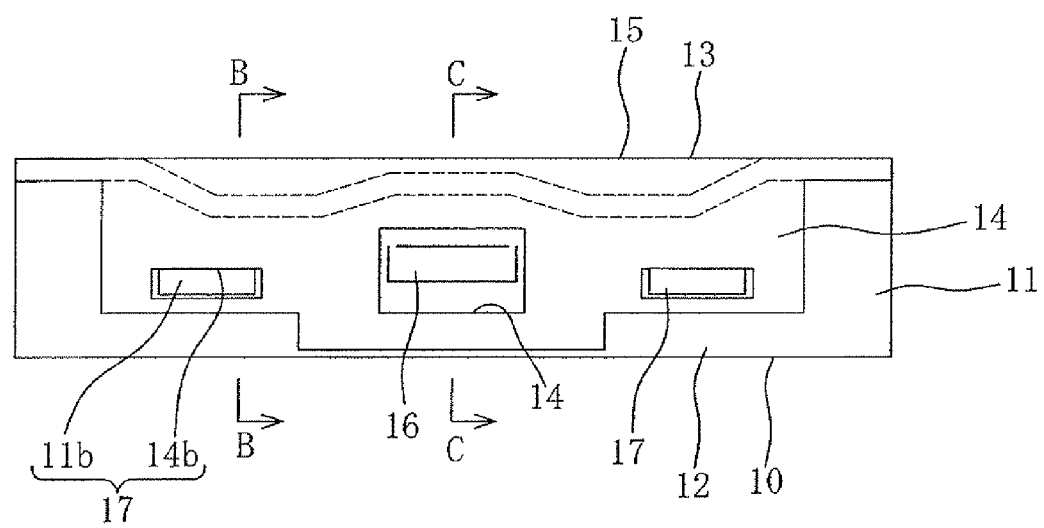
FIG. 2B is a side view of the optical fiber ribbon holding member of FIG. 1.
Figure 3:
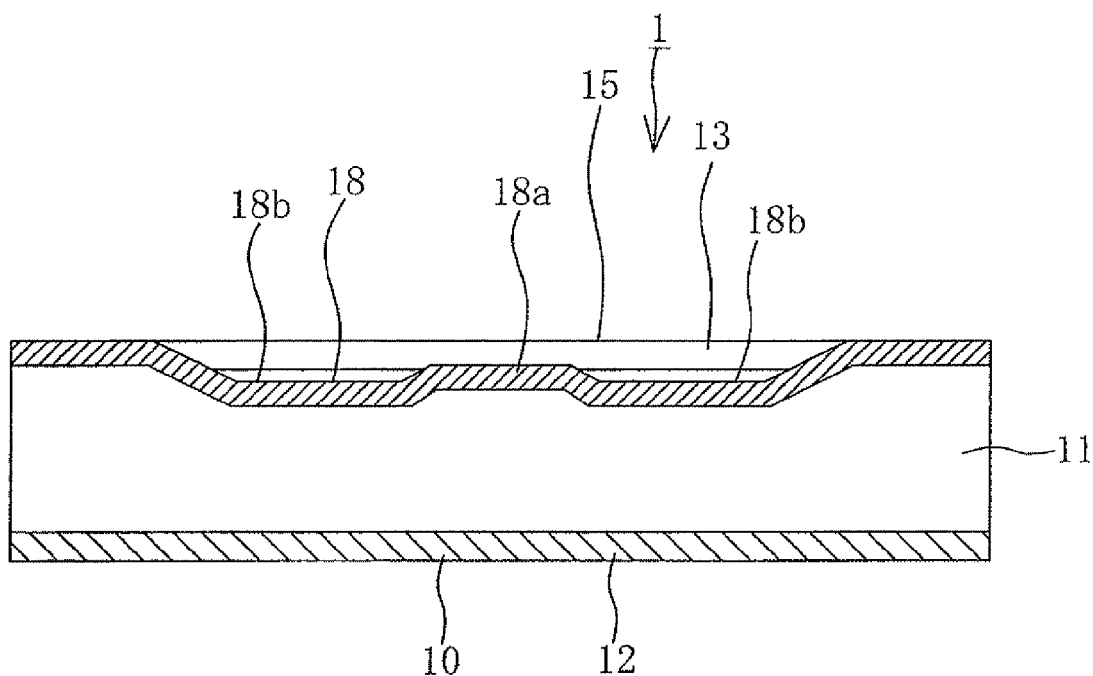
FIG. 3 is a sectional view along A-A of FIG. 2.
Figure 4A:
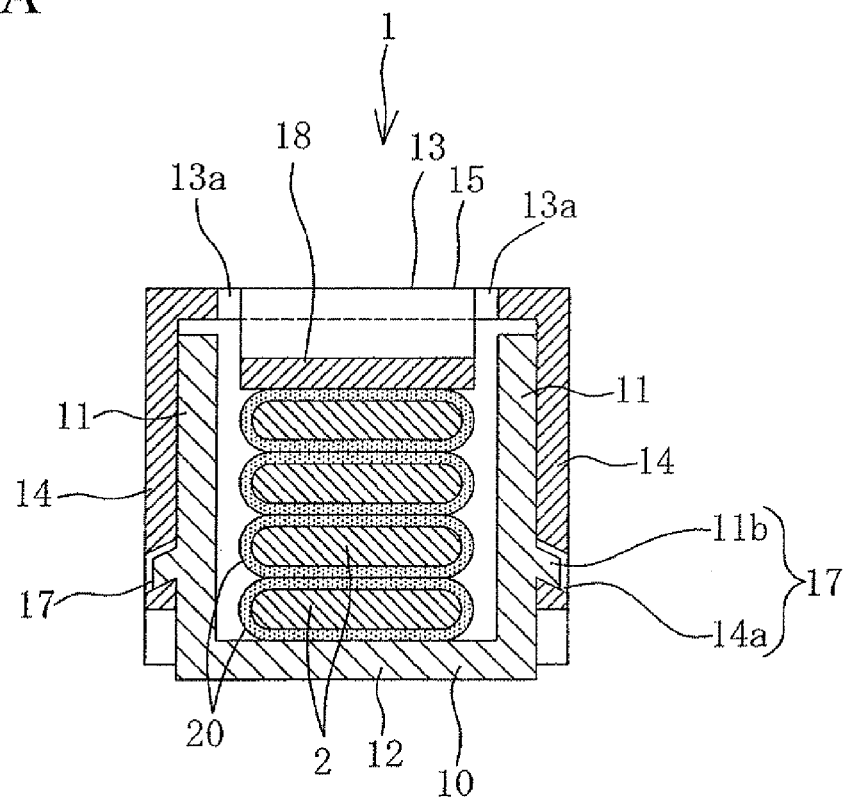
FIG. 4A is a sectional view of along the sectional position B-B in FIG. 2, and is a transverse sectional view of the optical fiber ribbon holding member in FIG. 1 showing a state in which the optical fiber ribbon is held and a lid body is mounted on the holding member main body using a second latch structure.
Figure 4B:
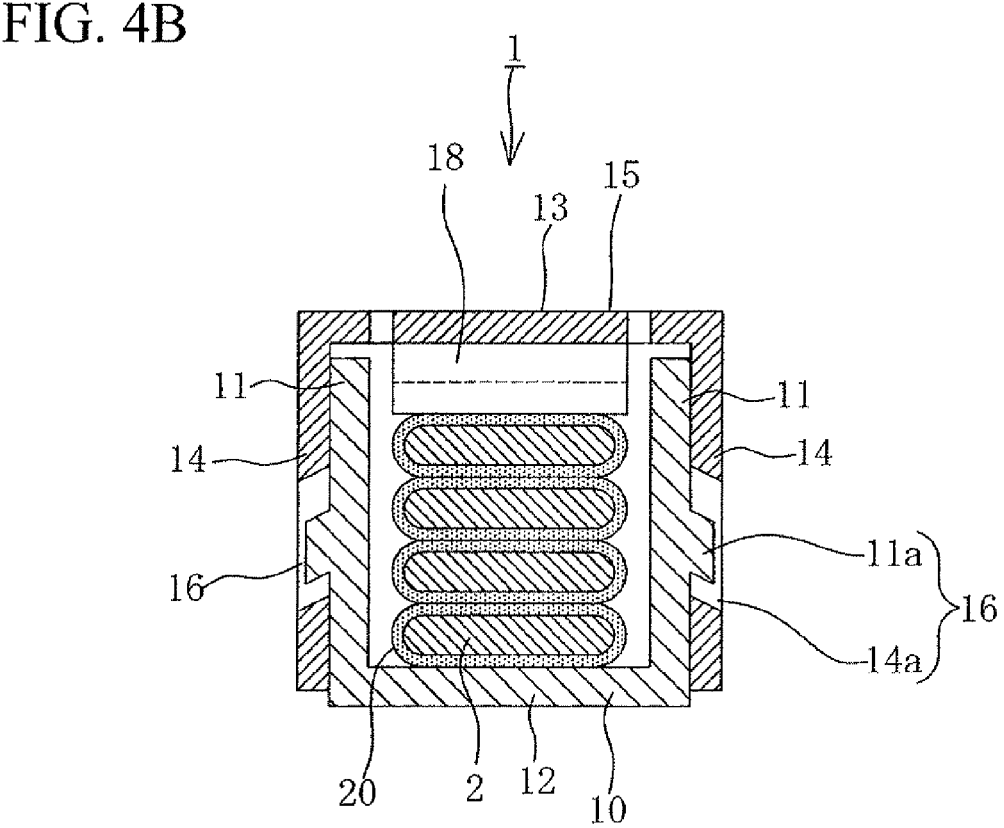
FIG. 4B is a sectional view of along the sectional position C-C in FIG. 2, and is a transverse sectional view of the optical fiber ribbon holding member in FIG. 1 showing a state in which the optical fiber ribbon are held and the lid body is mounted on the holding member main body using the second latch structure.
Figure 5:
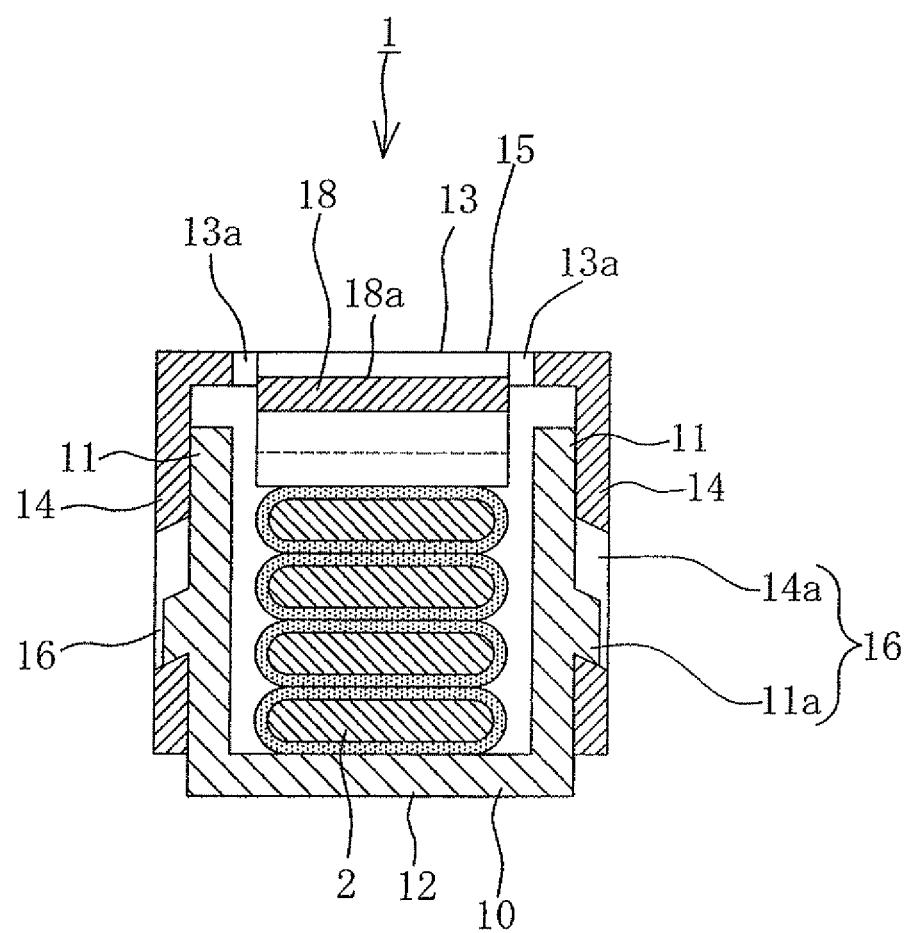
FIG. 5 is a sectional view along the sectional position C-C in FIG. 2 showing a state in which the lid body is mounted on the holding member main body using the first latch structure.

FIG. 2A is a plan view of the optical fiber ribbon holding member 1, FIG. 2B is a side view, and FIG. 3 is a sectional view along A-A of FIG. 2A. FIG. 4A, FIG. 4B and FIG. 5 are sectional views showing the configuration in which a plurality of optical fiber ribbons 2 (4 in the example in the figure) are held with the optical fiber ribbon holding member 1.

As shown in the drawings, the optical fiber ribbon holding member 1 includes a holding member main body 12 to which a plurality of optical fiber ribbons can be laminated and accommodated, and a lid body 15 which covers an opening surface of the holding member main body 12. The holding member main body 12 has an upward U-shaped cross section with a bottom portion 10 and both side of wall portions 11. The lid body 15 has a downward U-shaped cross section with a top surface portion 13 and both side of wall portions 14.

The holding member main body 12 may be made of resin, or may be made of metal. The lid body 15 in the embodiment is assumed to be a metal plate, but may be made of resin.

Two types of latch structure 16, 17 are provided on the wall portions 14 of the lid body 15 and the wall portions 11 of the holding member main body 12. An engaging click and an engaging recess of the latch structure 16, 17 engage to each other when the lid body 15 covers the holding member main body 12. The two types of latch structure 16, 17 are a two step latch structure that functions in different stages as described below.

The lid body 15 includes an optical fiber ribbon pressing portion 18 that presses the optical fiber ribbon 2 which accommodated in the holding member main body 12 in a laminated state.

The optical fiber ribbon holding member 1 in the example illustrated in the figure has a length (25 mm) that is the same as the length of a conventional heat shrinkable tube used as an optical fiber ribbon holding member.

The optical fiber ribbon pressing portion 18 has a structure in which the top surface portion 13 of the lid body 15 has a plate spring shape. In other words, the optical fiber ribbon pressing portion 18 includes slits 13a which are provided on both sides of the top surface portion 13 to thereby edges of the middle part thereof in with direction are cut (trimmed) from both side portions, and as shown in FIG. 3, the cross section shape between both slits 13a is formed in a wavelike shape in which the central portion is formed as a mount 18a and both sides form valleys 18b and then a plate spring function is present.

The first latch structure 16 of the two step latch structure 16, 17 includes an engaging click 11a provided in a central portion of the wall portions 11 on both sides of the holding member main body 12 and an engaging recess 14a that is provided in a central portion of the wall portions 14 on both sides of the lid body 15 and that engages with the engaging click 11a.

The first latch structure 16 is a first step latch structure which functions in an engaged state shown in FIG. 5. At that time, although the optical fiber ribbon pressing portion 18 which also forms the top surface portion 13 of the lid body 15 presses the laminated ribbons 2, and is subjected to elastic deformation due to the reaction force from the ribbons 2, a path for release of that force is provided by the elastic deformation of the central mount 18a.

When engaged by the first step latch structure 16, the laminated optical fiber ribbons 2 are slightly pressured to a level that does not cause indiscriminant positional deviation. Therefore, when the lid body 15 is engaged with the holding member main body 12 by the latch structure 16, adjustment of the position of the ribbons 2 is possible.

The second latch structure 17 is provided on both sides of the first latch structure 16, and includes an engaging click 11b provided respectively on both longitudinal sides of the wall portions 11 on both sides of the holding member main body 12 and an engaging recess 14b provided respectively on both longitudinal sides of the wall portions 14 on both sides of the lid body 15, and that engages with the engaging click 11b.

Figure 6A:
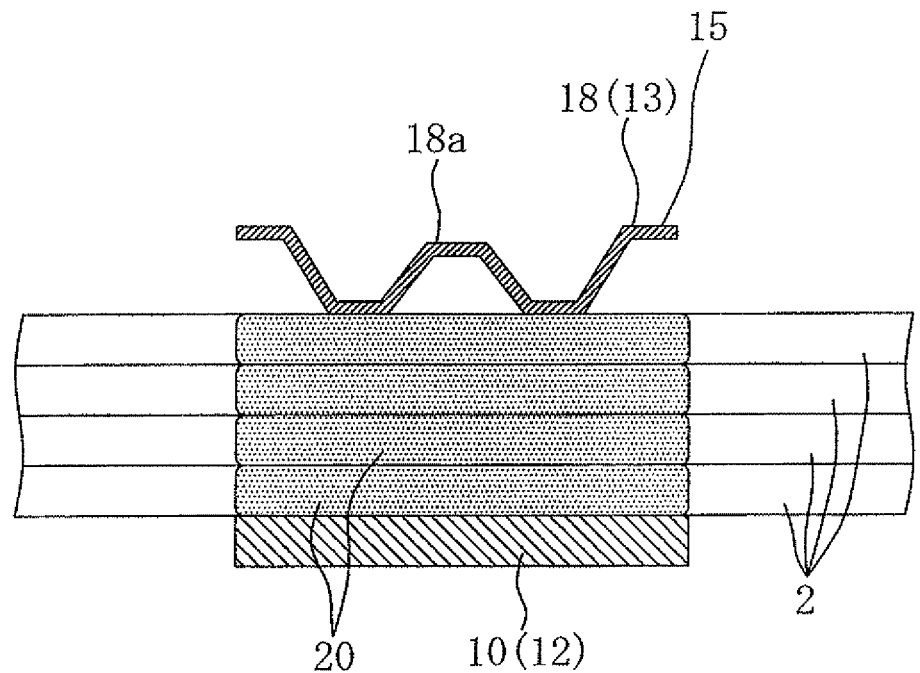
FIG. 6A is a schematic longitudinal sectional view showing a state before fixing by the lid portion of the holding member fixture showing the operation for fixing the optical fiber ribbon holding member that holds laminated ribbons using the lid portion of the holding member fixture for fixing the holding member.
Figure 6B:
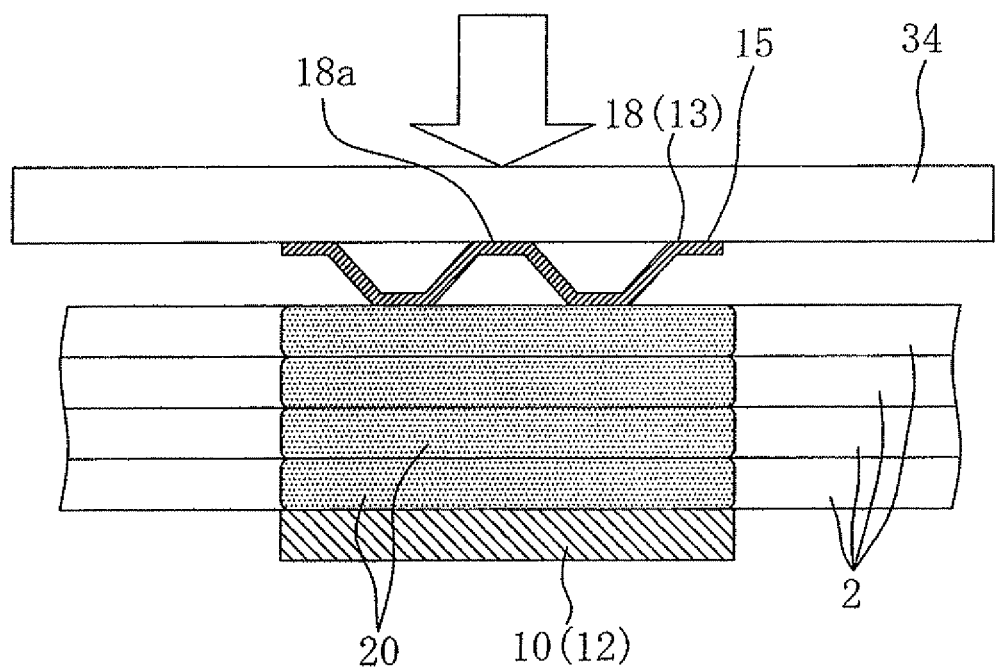
FIG. 6B is a schematic longitudinal sectional view showing a state after fixing by the lid portion of the holding member fixture showing the operation for fixing the optical fiber ribbon holding member that holds laminated ribbons using the lid portion of the holding member fixture for fixing the holding member.
Figure 8:
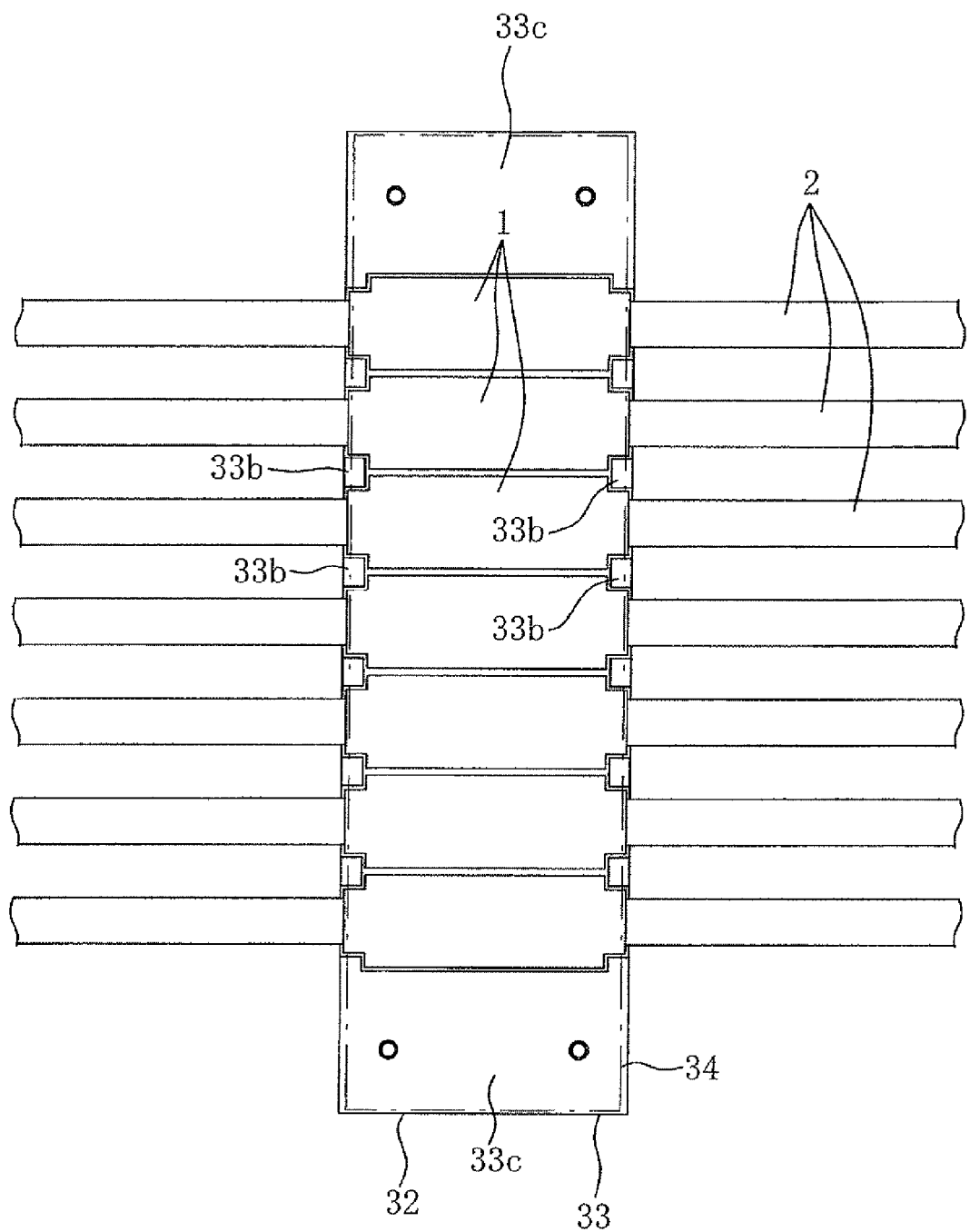
FIG. 8 is an enlarged plan view of a portion of the holding member fixture in FIG. 7.

The second latch structure 17 is a second step latch structure which functions in an engaged state shown in FIG. 4A when the lid body 15 is depressed further from the state shown in FIG. 5. In this state, as shown in FIG. 6B, FIG. 7 and FIG. 8, the lid portion 34 of the holding member fixture 32 is threadably fixed to the lid fixing portion 33c on both sides of the base portion 33 of the holding member fixture 32. Therefore when the lid body 15 of the optical fiber ribbon holding member 1 is pressed further by the lid portion 34, the optical fiber ribbon pressing portion 18 presses the laminated optical fiber ribbons 2 with a further stronger pressing force, thereby a robust fixation is achieved.

In the present embodiment, a rubber tube 20 covers each optical fiber ribbon 2 as shown in FIG. 4A, FIG. 4B, FIG. 5, FIG. 6A and FIG. 6B. The rubber tube 20 has anti-slip function between the optical fiber ribbons 2, and between the lowermost or the uppermost optical fiber ribbon 2 and the bottom portion 10 of the holding member main body 12 or the optical fiber ribbon pressing portion 18 of the lid body 15.

As illustrated in the example in the figures, although the rubber tubes 20 cover all the optical fiber ribbons 2. However, when one of the optical fiber ribbons 2 that are vertically adjacent is covered by the rubber tube 20 with respect to the middle optical fiber ribbon 2 except the uppermost and the lowermost optical fiber ribbons, the anti-slip function is effectively operated so that the rubber tube 20 can be omitted alternately.

Also, the invention is not limited to the rubber tube, for example, rubber material such as a simple rubber sheet may be inserted between the optical fiber ribbons, between the lowermost layer of the optical fiber ribbon and the bottom portion 10, and between the uppermost layer of the optical fiber ribbon and the top surface portion 23.

During shipping of the component, engagement with the first latch structure 16 is executed without deeply pressing the lid body 15. Consequently, the optical fiber ribbon 2 is held by the optical fiber ribbon holding member 1 such that the optical fiber ribbon 2 are not widely misaligned (deviation), and thereby the optical fiber ribbon 2 loosely held to such a degree that the optical fiber ribbons 2 can be adjusted.

When a user fixes the optical fiber ribbon holding member 1 that holds the laminated optical fiber ribbons 2 to the holding member fixture 32 that is fixed to the device base plate 31, as illustrated in FIG. 7 and FIG. 8, each optical fiber ribbon holding member 1 is set to the holding member installation portion provided on the base portion 33 of the holding member fixture 32. The holding member installation portion is denoted in FIG. 9A by reference numeral 33a.

Figure 9A:
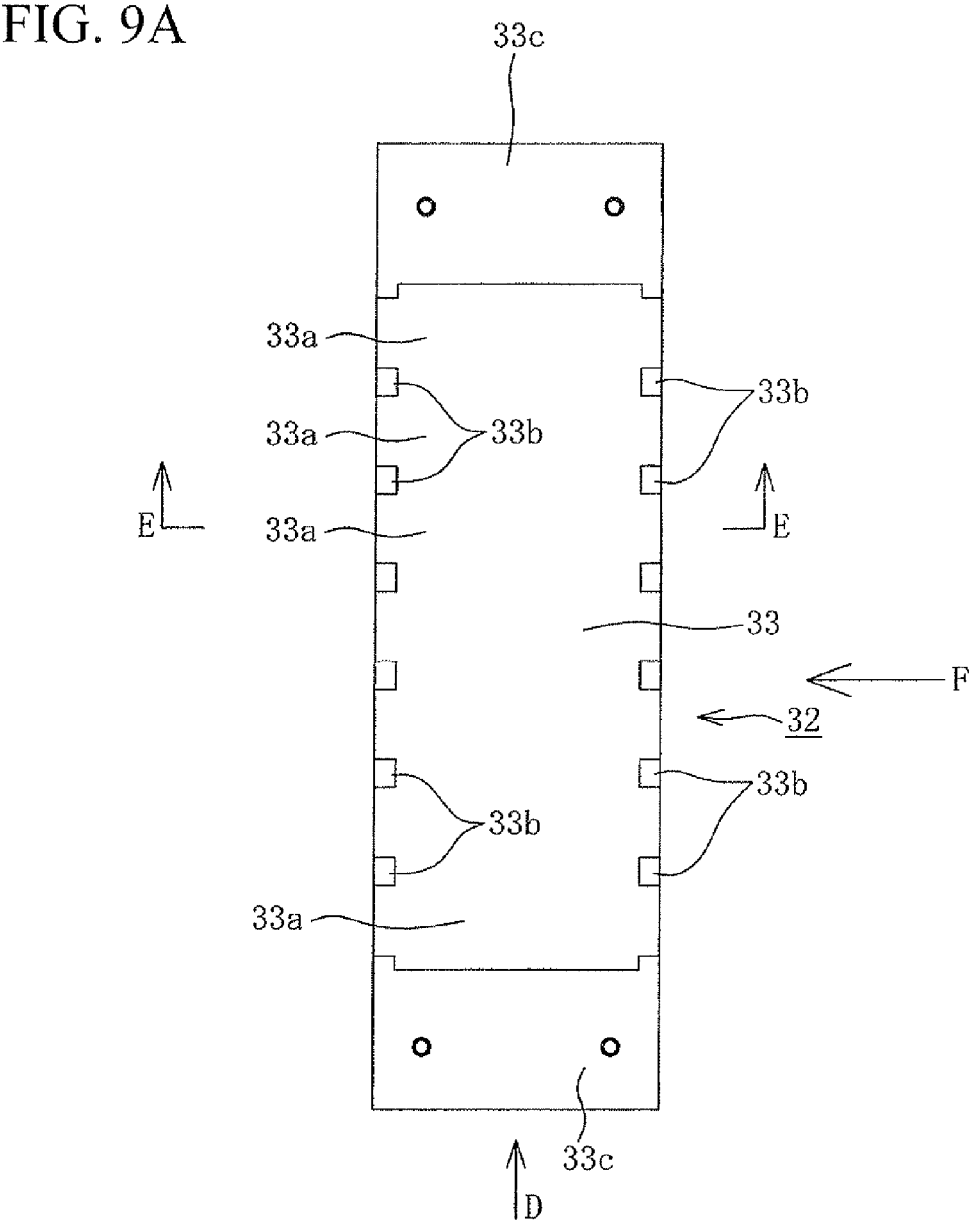
FIG. 9A is a plan view showing the holding member fixture in FIG. 7 and FIG. 8.
Figure 9B:
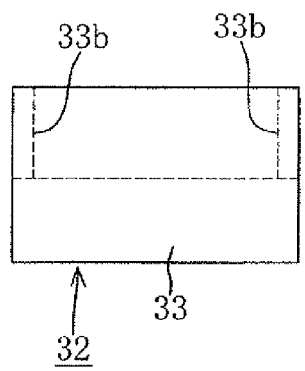
FIG. 9B is a view seen from arrow mark D in FIG. 9A and shows the holding member fixture in FIG. 7 and FIG. 8.
Figure 10:
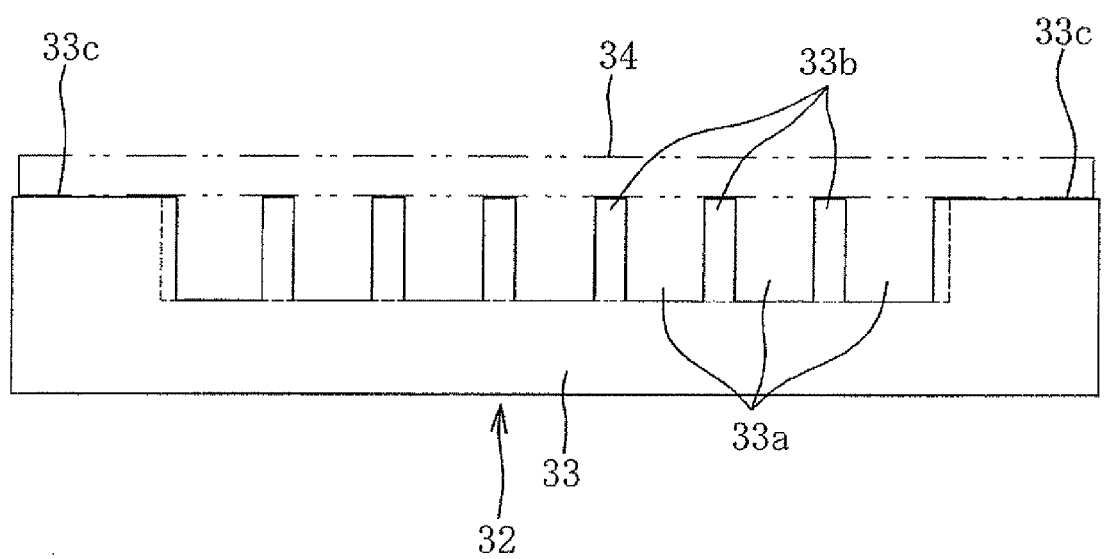
FIG. 10 is a view seen from arrow mark F in FIG. 9A
Figure 11:
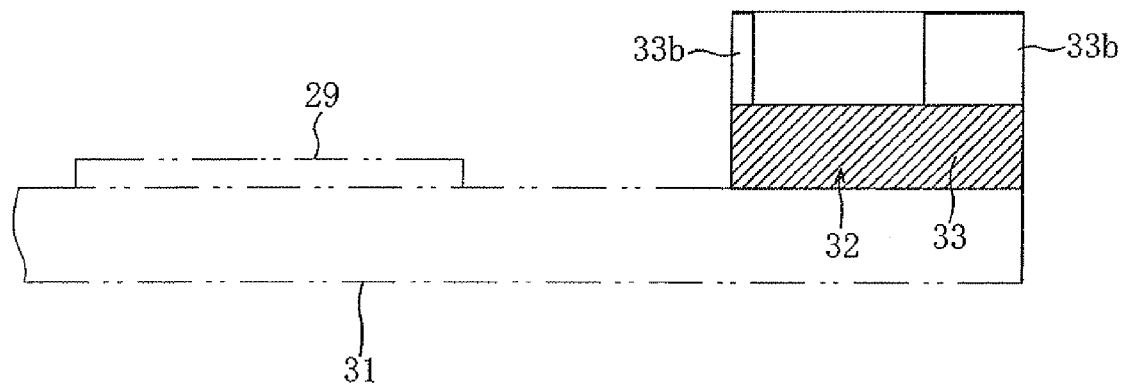
FIG. 11 is a sectional view along the sectional position E-E in FIG. 9A.

The holding member installation portion 33a as illustrated in FIG. 9A and FIG. 9B is formed as a space defined by the four posts 33b of the vertically upright quadrilateral sectional surface on the base portion 33 of the holding member fixture 32 to engage on both transverse sides with respect to both longitudinal ends of the optical fiber ribbon holding member 1.

The four posts 33b enclosing a single optical fiber ribbon holding member 1 restrain the optical fiber ribbon holding member 1 in a width direction by sandwiching both end portions of the wall portion 11 of the holding member main body 12 in a width direction, and restrain the optical fiber ribbon holding member 1 in a longitudinal direction by sandwiching both longitudinal end portions of the wall portions 14 of the lid body 15, and thereby position the optical fiber ribbon holding member 1.

Next, the lid portion 34 of the holding member fixture 32 is threadably engaged with the lid fixing portion 33c of the base portion 33, and fixes the optical fiber ribbon holding member 1 to the holding member fixture 32.

At this time, the optical connector 3 mounted on each optical fiber ribbon 2 held by the optical fiber ribbon holding member 1 is installed with high positional accuracy on the designated mounting position on the substrate 29.

When the position of the optical connector 3 is shifted from the designated mounting position, since the first step latch structure 16 is loosely engaged to a level that the optical fiber ribbons 2 can be adjusted, thereby, readjustment of the position of the laminated optical fiber ribbons 2 is enabled by removing the optical fiber ribbon holding member 1 from the holding member fixture 32, releasing the second step latch structure 17 without removing the lid body 15 that is engaged with the first step latch structure 16.

In this manner, the optical fiber ribbon holding member 1 facilitates operations for stacking and holding optical fiber ribbons by enabling retention of the optical fiber ribbons 2 by merely an operation of covering with the lid body 15.

Since positional readjustment of the optical fiber ribbons 2 is enabled by releasing the second step latch structure 17 without removing the lid body 15 that is engaged with the first step latch structure 16, optical fiber ribbon readjustment operations are simplified.

Operations are simplified since a heating operation such as that used in relation to a conventional heat shrinkable tube is not required, and therefore positional readjustment of the optical fiber ribbon is enabled with a detachable lid. Even when components are shipped without highly accurate positioning, a user can perform simple and high accuracy positioning to thereby the optical fiber ribbon can be laminated and held.

Although the optical fiber ribbon pressing portion 18 according to the present embodiment is configured by forming the shape of the top surface portion 13 of the lid body 15 as a plate spring, the invention is not limited thereby, and for example, another configuration such as attachment of a rubber sheet to an inner surface of a flat top surface portion may be employed.

Second Embodiment

Figure 12:
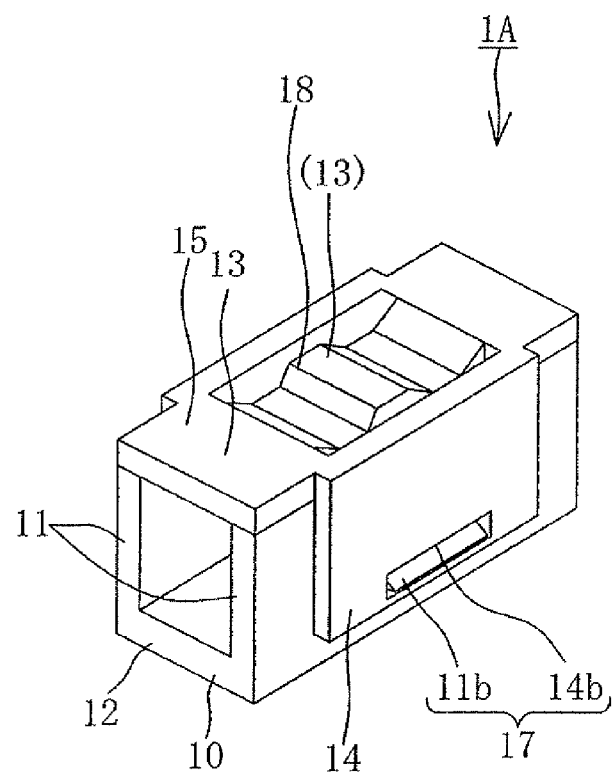
FIG. 12 is a perspective view of the optical fiber ribbon holding member according to another embodiment of the present invention.
Figure 13:
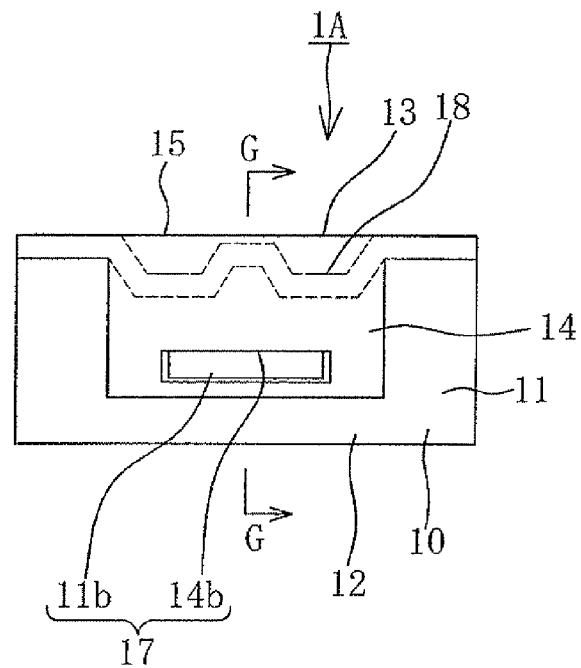
FIG. 13 is a lateral view of the optical fiber ribbon holding member according to FIG. 12.

FIG. 12 and FIG. 13 illustrate an optical fiber ribbon holding member 1A according to another embodiment.

The optical fiber ribbon holding member 1A according to the present embodiment includes a holding member main body 12 having the bottom portion 10 and the both sides wall portions 11, and a lid body 15 which has the top surface portion 13 and the both sides wall portions 14. An optical fiber ribbon pressing portion 18 is provided with slits 13a on both sides of the top surface portion 13, and the front surface portion 13 is formed into a plate spring. In this manner, the basic structure is generally the same as the optical fiber ribbon holding member 1 according to the first embodiment. However, the length in the present embodiment is half of the length of the optical fiber ribbon holding member 1 of the first embodiment.

The optical fiber ribbon holding member 1A is employed when the length of the holding member installation portion 33a in the holding member fixture 32 for fixing a holding member (the interval between the left and right posts 33b in FIG. 8 and FIG. 9A) is short.

The latch structure 17 in the optical fiber ribbon holding member 1A is only provided at one position on one side, and includes an engaging click 11b provided in the wall portions 11 on both sides of the holding member main body 12 and an engaging recess 14b that is provided in the wall portions 14 on both sides of the lid body 15. In other words, the structure of the second latch structure 17 is as the same as that of the optical fiber ribbon holding member 1 in the first embodiment, thereby the laminated optical fiber ribbons 2 can be tightly held.

Third Embodiment

Figure 14:
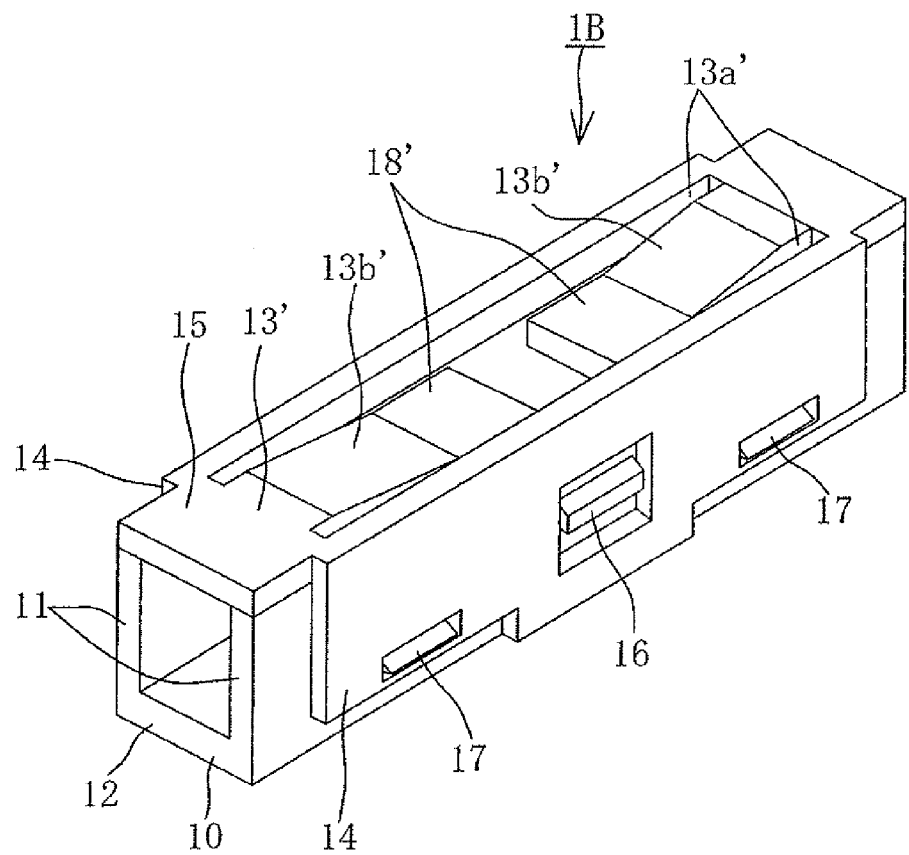
FIG. 14 is a perspective view of the optical fiber ribbon holding member according to a further embodiment of the present invention.
Figure 15:
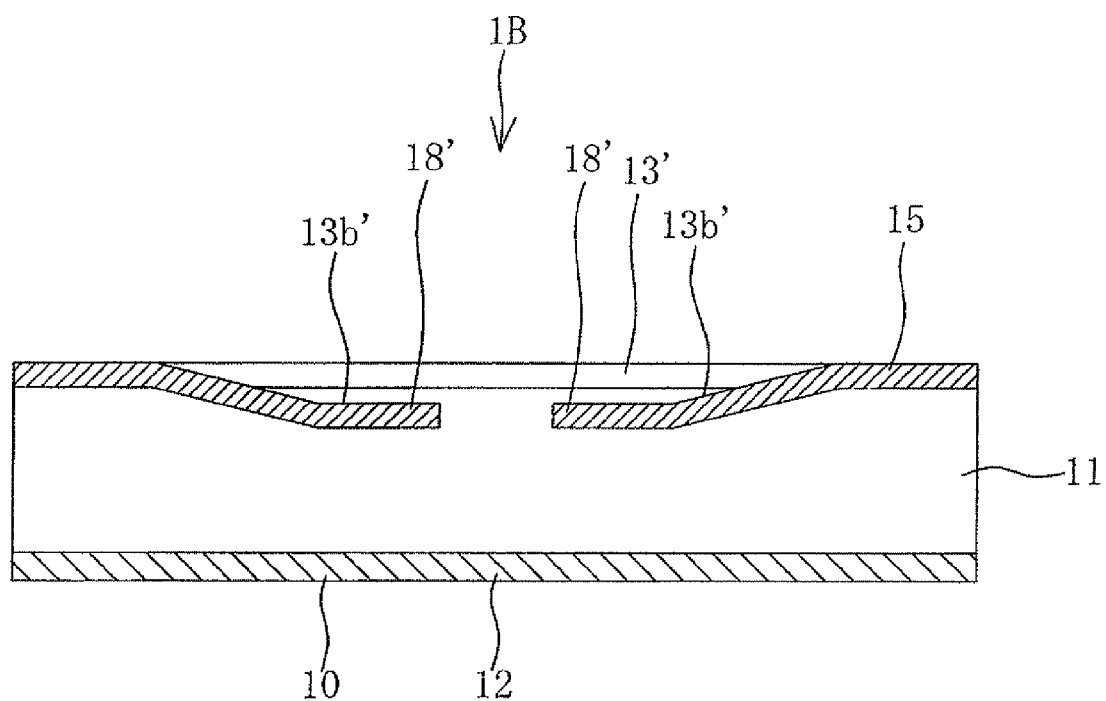
FIG. 15 is a longitudinal sectional view of the optical fiber ribbon holding member in FIG. 14.

FIG. 14 and FIG. 15 illustrate an optical fiber ribbon holding member 1B according to yet another embodiment.

The optical fiber ribbon holding member 1B according to the present embodiment is a variation on the structure of the optical fiber ribbon pressing portion 18 formed on the top surface portion 13 in the optical fiber ribbon holding member 1 shown in FIG. 1 according to the first embodiment.

In other words, in the optical fiber ribbon holding member 1B, the features that are common to FIG. 1 are that an optical fiber ribbon pressing portion 18' formed on the top surface portion 13' includes slits 13a' on both sides of the top surface portion 13' of the lid body 15, and the top surface portion 13' itself is formed as a plate spring. However, in the optical fiber ribbon holding member 1B, the longitudinal central portion of the portion sandwiched by the slits 13a' on both sides of the top surface portion 13' is cut out, and the extended piece 13b' that extends from both longitudinal sides of the top surface portion 13' to a central portion is firstly bent downwardly and then extended horizontal to form a cantilevered plate spring.

Other configurations are the same as the optical fiber ribbon holding member 1 according to the first embodiment.

Fourth Embodiment

Figure 16A:
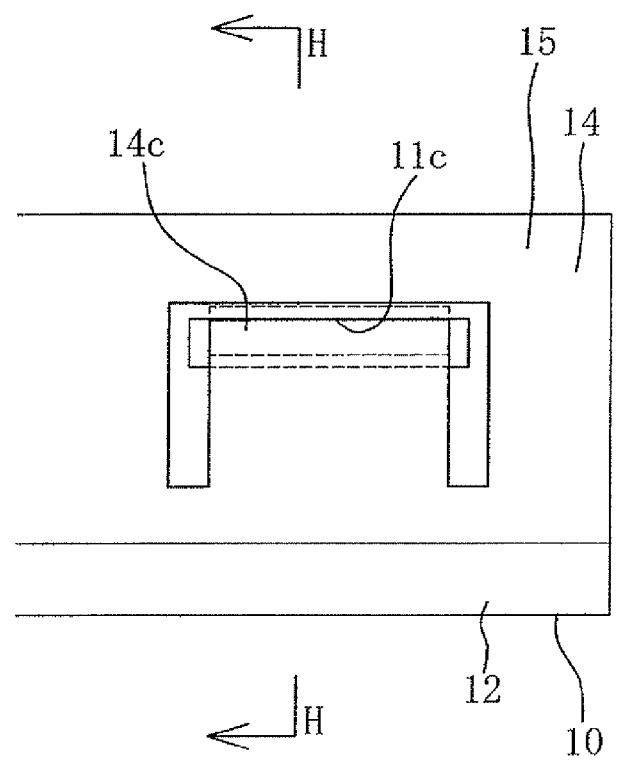
FIG. 16A is an enlarged view of the main portions of the optical fiber ribbon holding member and shows another embodiment of the latch structure part in the optical fiber ribbon holding member according to FIG. 14.
Figure 16B:
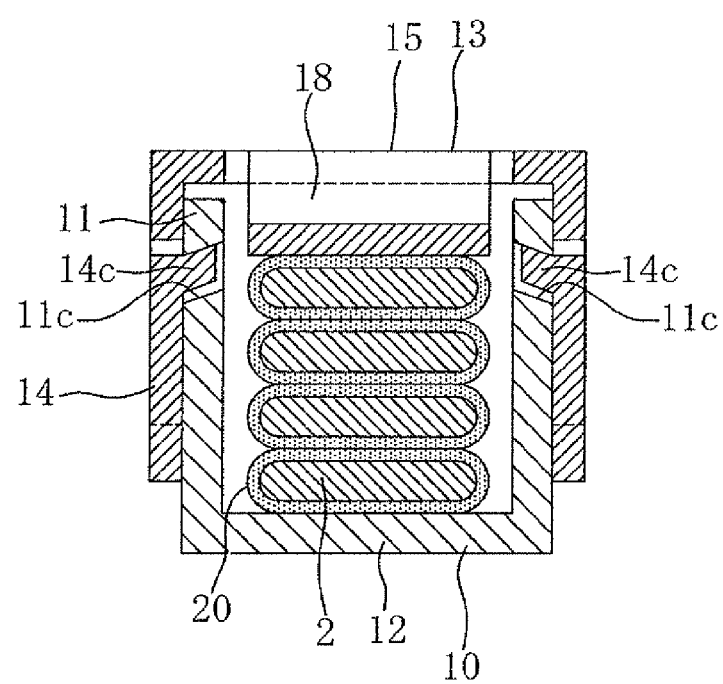
FIG. 16B is a sectional view along the sectional position H-H of FIG. 16A and shows another embodiment of the latch structure part in the optical fiber ribbon holding member according to FIG. 14.

In each of the above embodiments, an example was described in which the latch which tightly engages the lid body 15 with the holding member main body 12 includes an engaging click 11b on the wall portions near to the holding member main body 12 and an engaging recess 14b on the wall portions 14 near to the lid body 15. However, as shown by the latch structure as illustrated in FIG. 16A, FIG. 16B, a latch structure may be employed by providing an engaging recess 11c on the wall portions 11 on both sides of the holding member main body 12, and an engaging click 14c on the wall portions 14 on both sides of the lid body 15.

Fifth Embodiment

Figure 17A:
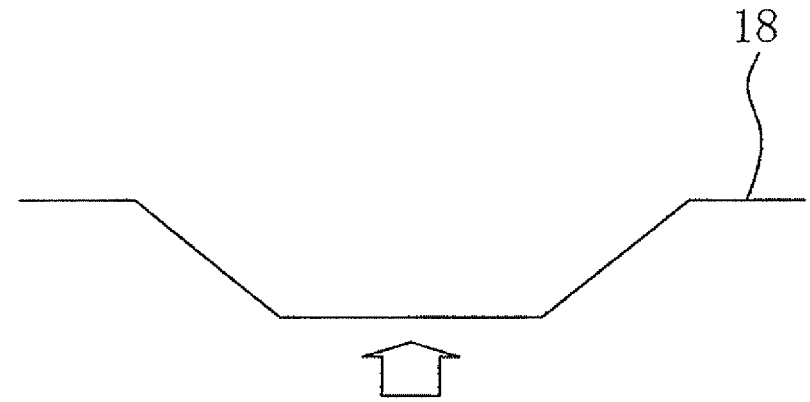
FIGS. 17A, 17B and 17C is a view illustrates the difference in operation effect resulting from the cross section shape of the optical fiber ribbon pressing portion in a case where the optical fiber ribbon pressing portion as the bottom portion of the lid body is configured as a plate spring shape.
Figure 17B:
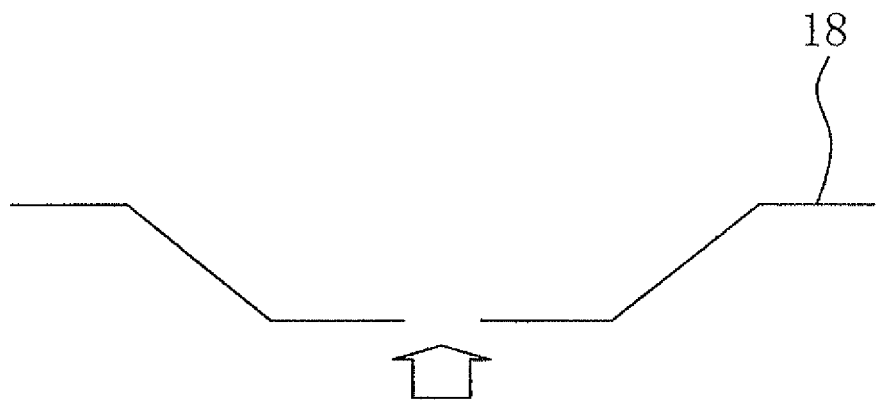
Figure 17C:
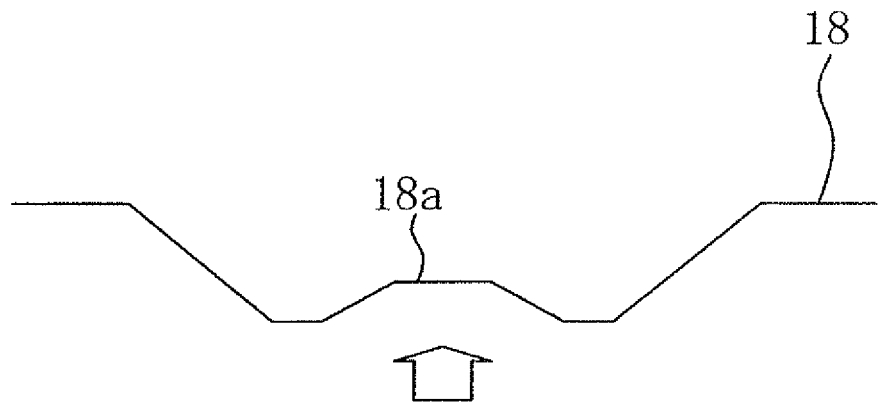

When the top surface portion 13 is formed as a plate spring shape as the optical fiber ribbon pressing portion 18 provided on the lid body 15, the sectional profile may include the sectional profile in FIG. 17A, the sectional profile in FIG. 17B (embodiment shown in FIG. 14), and the sectional profile in FIG. 17C (generally the embodiment shown in FIG. 1) and the like, the sectional profile in FIG. 17C may be preferred.

In other words, when using the configuration in FIG. 17A, if the optical fiber ribbon pressing portion 18 deforms, a force dispersal path is not provided, deformation becomes concentrated in the base, and there is a risk of plastic deformation of the material. The arrow in the figure denotes the applied force.

On the other hand, when using the configuration in FIG. 17B, although a force dispersal path is provided, the material undergoes elastic deformation, and although an elastic function is maintained, the pressing force is not very large.

However when using the configuration in FIG. 17C, since a force dispersal path is provided by the elastic deformation of a portion of the mount 18a in the central portion, the spring function can be maintained without plastic deformation. In addition, in comparison to the sectional profile illustrated in FIG. 17B, a larger pressing force can be obtained.

Sixth Embodiment

In each of the above embodiments, although an example was described in which a plurality of ribbons is held, the optical fiber ribbon holding member according to the present invention may also be applied to hold a single ribbon. In this case, the bottom portion of the holding member main body may be raised.

When a designated optical fiber ribbon holding member for holding a single ribbon is used, the bottom portion of the holding member main body may be raised or the overall height may be lowered.

Furthermore, in addition to an optical path conversion type, the optical connector mounted on the distal end of the optical fiber ribbon being the object of the optical fiber ribbon holding member according to the present invention may be a general optical connector. In addition, mounting of an optical connector is not always required.

Furthermore the optical fiber ribbon holding member according to the present invention is not limited to a configuration fixed to a holding member fixture for fixing a holding member that is fixed to a device base plate.

Seventh Embodiment

A seventh embodiment of the optical fiber ribbon holding member according to the present invention will be described below.

Figure 25:
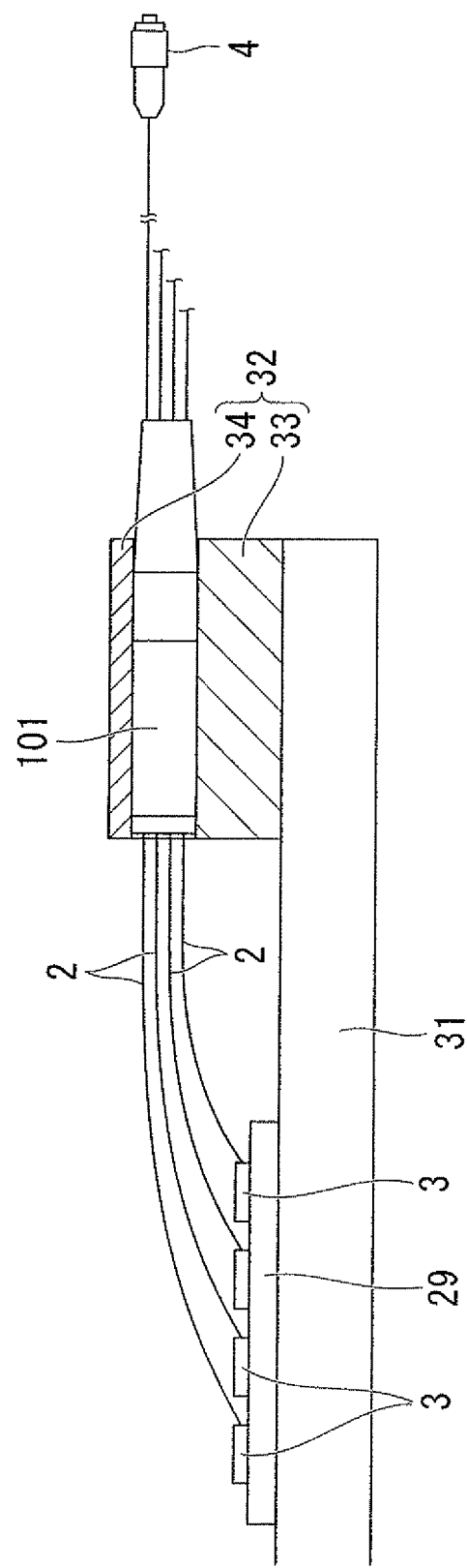
FIG. 25 is a lateral view showing a state in which the optical fiber ribbon holding member that holds an optical fiber ribbon is fixed to the device base plate.

As illustrated in FIG. 25, the optical fiber ribbon holding member 101 holds a plurality of optical fiber ribbons 2 in a laminated state which is mounted on the photoelectric composite substrate 29 in which the optical path conversion elements 3 at the distal end of the optical fiber ribbons 2 are mutually misaligned in the longitudinal direction of the optical fiber ribbon. The optical fiber ribbon holding member 101 is fixed to the holding member fixture 32 that is mounted on a device base plate 31 provided with the substrate 29.

The optical path conversion elements 3 mounted on the substrate 29 changes the optical path and performs optical coupling between the optical fiber ribbons 2 disposed along the substrate 29 and an optical element (not shown) mounted on the surface of the substrate 29.

Reference numeral 4 denotes the optical connector mounted on the other end of the optical fiber ribbon 2. Reference numeral 33 denotes a base portion of a holding member fixture 32, and reference numeral 34 denotes a lid portion covering the base portion 33.

Figure 18:
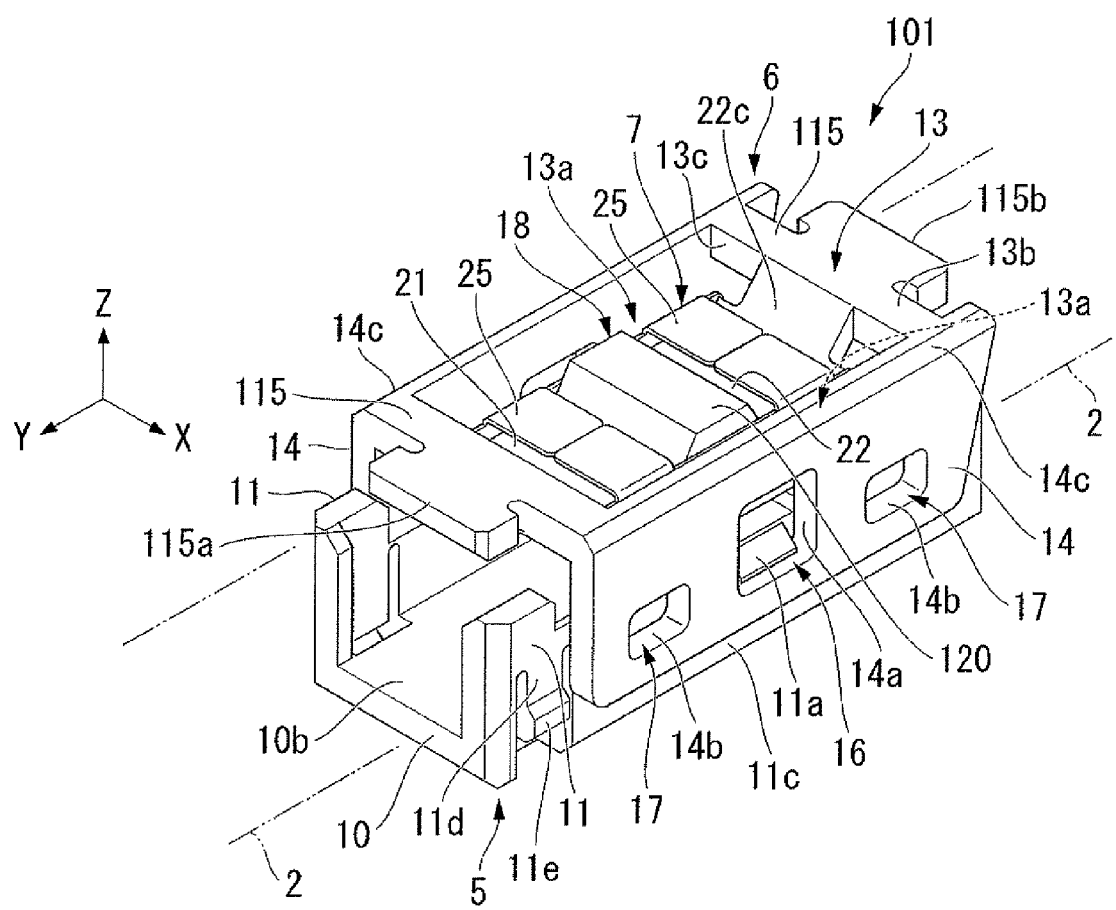
FIG. 18 is a perspective view showing a seventh embodiment of the optical fiber ribbon holding member according to the present invention.
Figure 19:
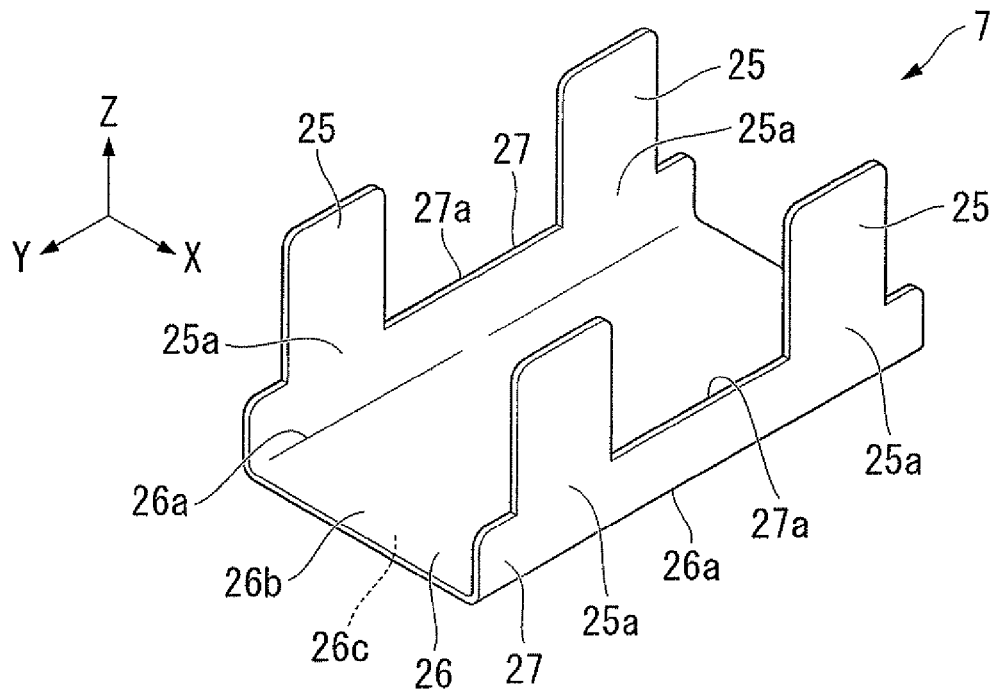
FIG. 19 is a perspective view showing a state before deformation of the pressure dispersion plate.
Figure 20:
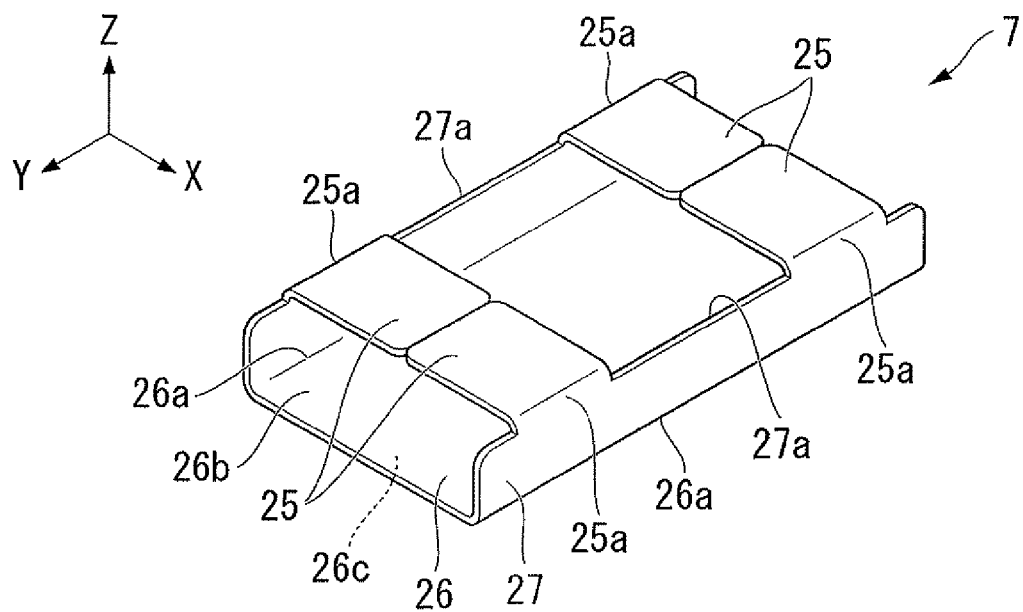
FIG. 20 is a perspective view showing a sate after deformation of the pressure dispersion plate.
Figure 21:
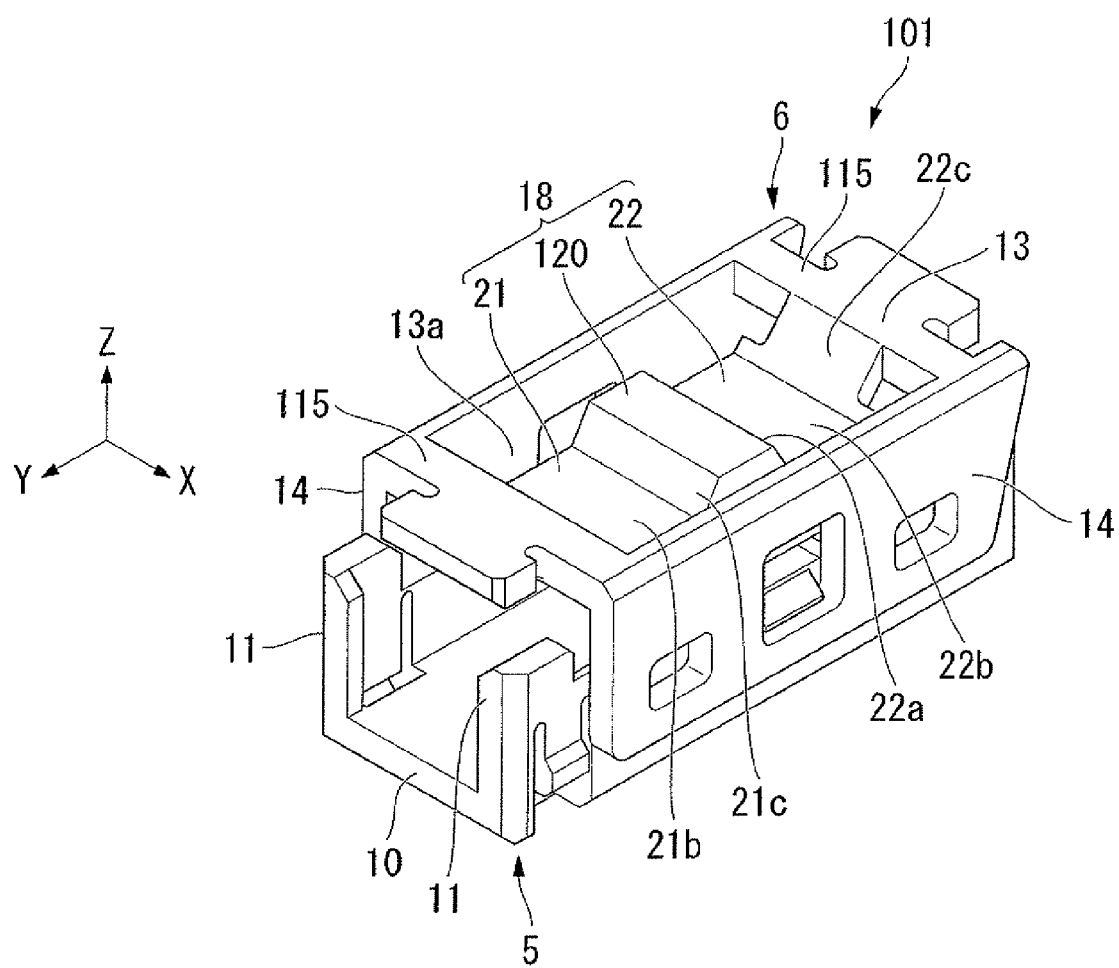
FIG. 21 is a perspective view showing the holding member main body and the lid body.
Figure 22:
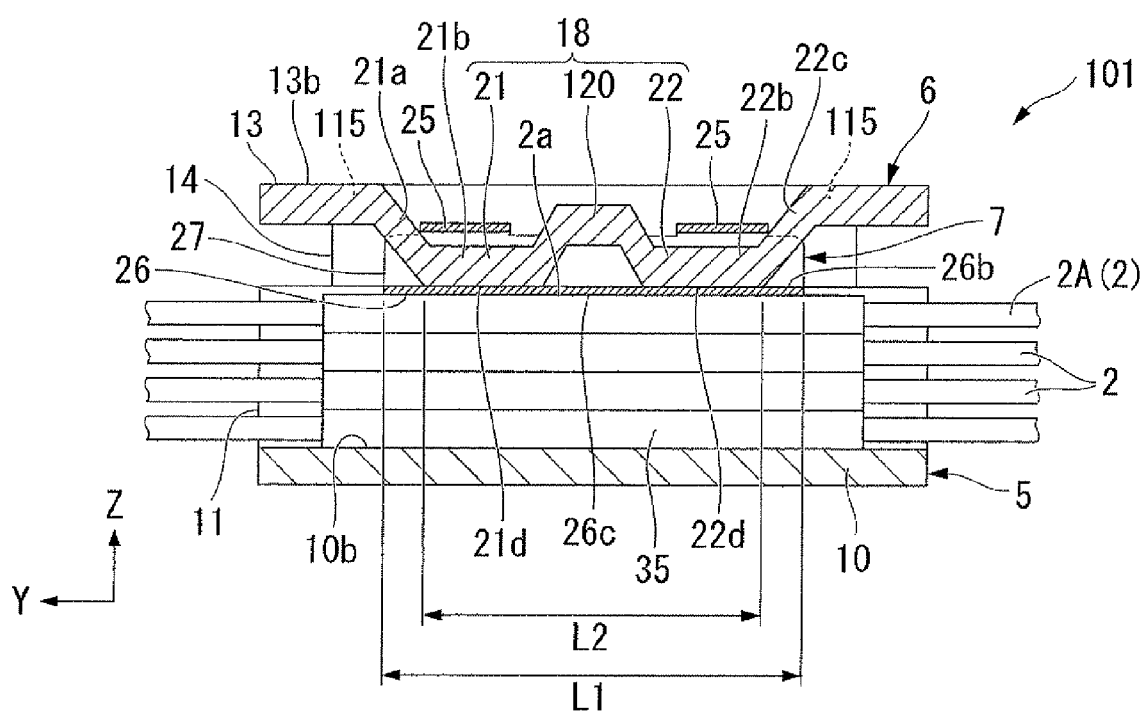
FIG. 22 is a longitudinal sectional view showing the optical fiber ribbon holding member.
Figure 23:
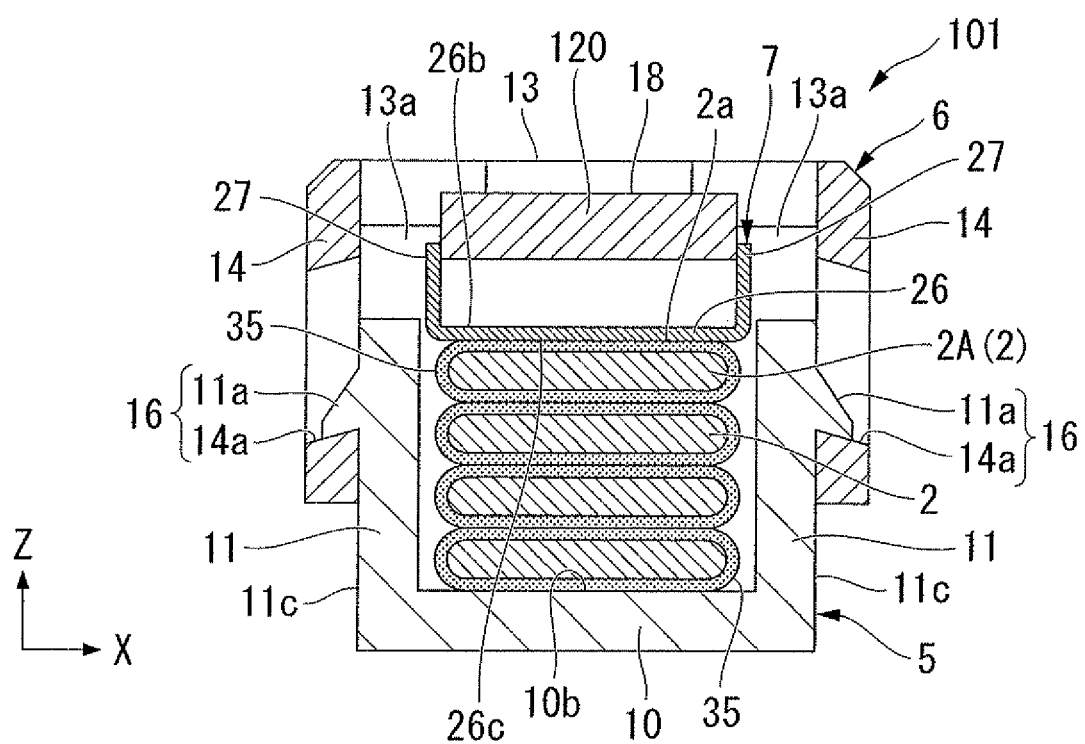
FIG. 23 is a transverse sectional view showing the optical fiber ribbon holding member in a state in which the lid body is mounted on the holding member main body using the first latch structure.
Figure 24A:
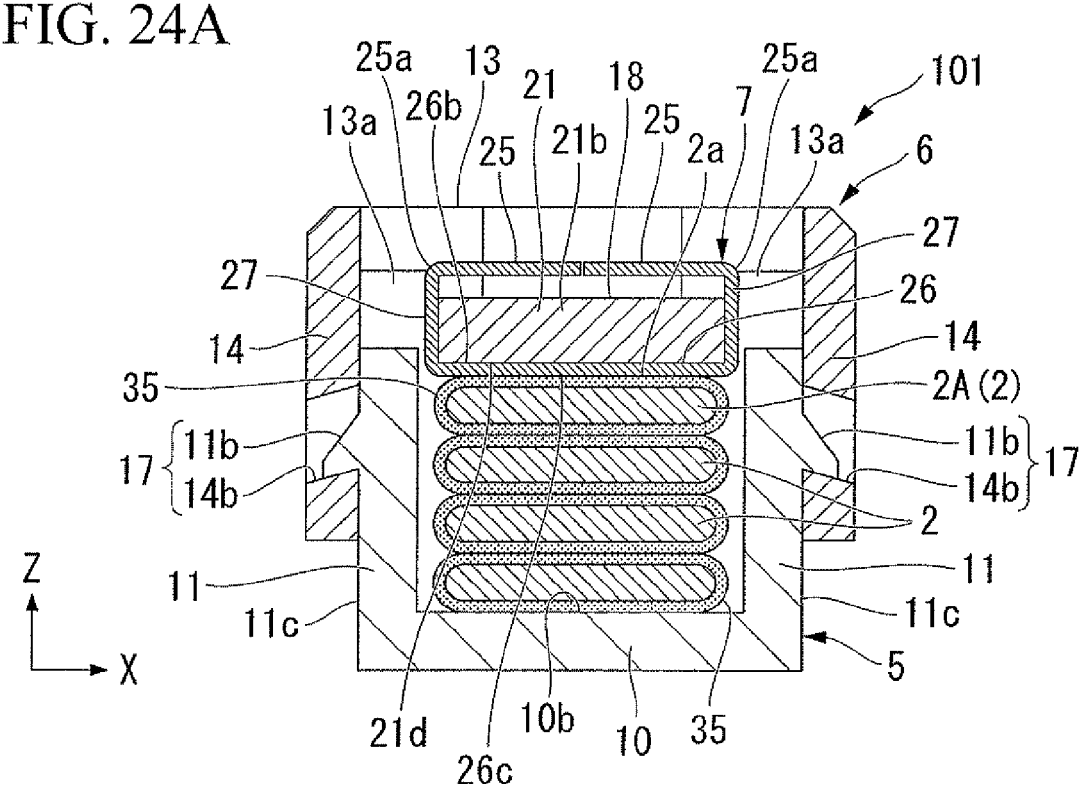
FIG. 24A is a transverse sectional view showing the optical fiber ribbon holding member in a state in which the lid body is mounted on the holding member main body using the second latch structure, and illustrates the second latch structure.
Figure 24B:
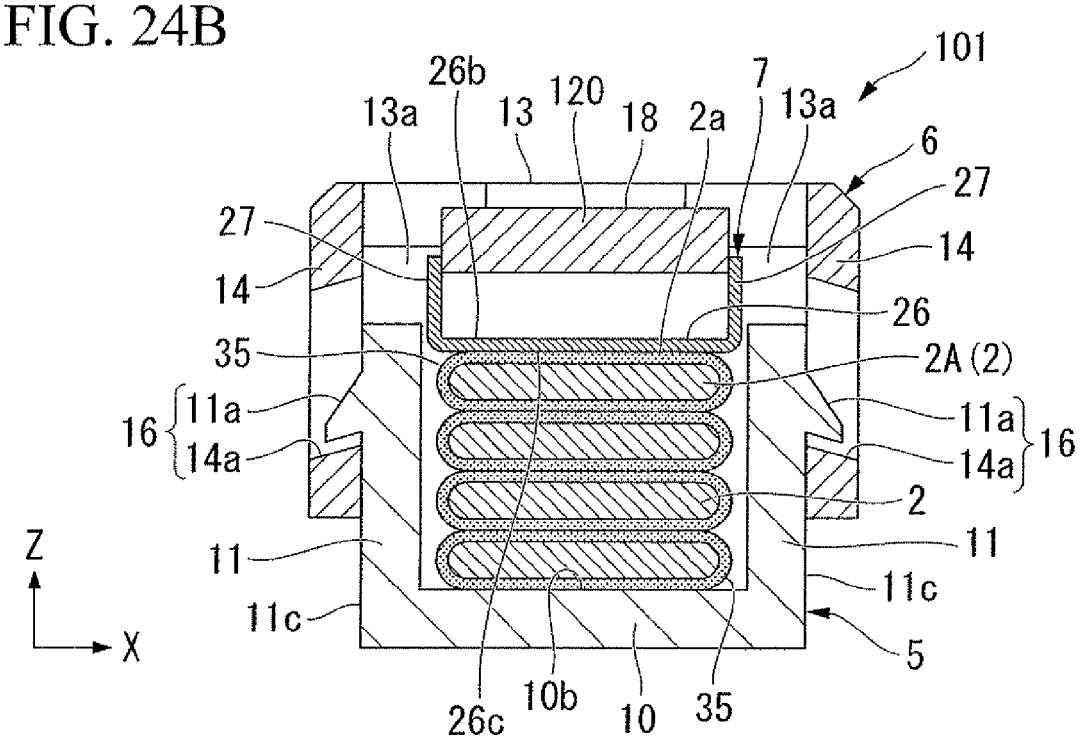
FIG. 24B is a transverse sectional view showing the optical fiber ribbon holding member in a state in which the lid body is mounted on the holding member main body using the second latch structure, and illustrates the first latch structure.

FIG. 18 to FIG. 24B illustrate an optical fiber ribbon holding member 101. FIG. 18 is a perspective view showing an optical fiber ribbon holding member 101. FIG. 19 and FIG. 20 are perspective views showing the configuration of the pressure dispersion plate 7 configuring the optical fiber ribbon holding member 101. FIG. 21 is a perspective view showing the holding member main body 5 and the lid body 6 configuring the optical fiber ribbon holding member 101. FIG. 22 is a schematic longitudinal sectional view showing the optical fiber ribbon holding member 101. FIG. 23, FIG. 24A and FIG. 24B are schematic transverse sectional views showing the optical fiber ribbon holding member 101.

As illustrated in FIG. 18, the optical fiber ribbon holding member 101 includes a holding member main body 5 for accommodating a plurality of optical fiber ribbons 2 in a laminated state as described below, a lid body 6 covering the holding member main body 5, and a pressure dispersion plate 7 disposed between the plurality of laminated optical fiber ribbons 2 and the lid body 6.

The holding member main body 5 includes a bottom portion 10 and wall portions 11, 11 configured in an upright orientation on both side edges in a width direction, to thereby accommodate the optical fiber ribbons 2 in an inner side thereof.

As illustrated in FIG. 18, an XYZ coordinate system will be applied in the following description. The coordinate system is defined by a Y direction being the insertion direction of the optical fiber ribbon 2 when inserted and accommodated in the holding member main body 5, an X direction being the width direction orthogonal to the insertion direction, and a Z direction that is the direction orthogonal to both the X and the Y direction (direction of laminating of the optical fiber ribbons 2).

In this holding member main body 5, the bottom portion 10 for example is rectangular plate, and the inner surfaces 10b are flat. The wall portions 11 for example are substantially vertical with respect to the bottom portion 10. The constituent material of the holding member main body 5 may be resin, but there is no particular limitation in this regard, and for example a metal such a stainless steel may be used.

The lid body 6 includes a bottom portion 13 (top surface portion) and wall portions 14, 14 that stand upright on both side edges in a width direction. The lid body 6 covers the holding member main body 5 by mutually opposing the inner sides. The constituent material of the lid body 6 may be resin, but there is no particular limitation in this regard, and for example a metal such as stainless steel may be used.

Two types of latch structure 16, 17 in which an engaging click and an engaging recess are mutually engaged are provided on the wall portions 11 of the holding member main body 5 and the wall portions 14 of the lid body 6. The latch structures 16, 17 function in different stages as described below, and configure a so-called two step latch structure.

An abutting piece 11d that undergoes elastic bending deformation in a width direction (X direction) extends downwardly from both external end surfaces of the wall portions 11, 11. An abutting projection 11e that abuts with the post 33b of the holding member fixture 32 as described below is formed on the outer surface of the distal end of the abutting piece 11d.

As illustrated in FIG. 21 and FIG. 22, the lid body 6 includes a pressing portion 18 for pressing the plurality of optical fiber ribbons 2 accommodated in the holding member main body 5.

The pressing portion 18 has a structure in which a portion of the bottom portion 13 is formed as a plate spring shape. In other words, the pressing portion 18 includes slits 13a on both sides in the width direction (X direction) of the bottom portion 13 and separates the intermediate portion from both side portions in the width direction. As shown in FIG. 22, the sectional profile of the intermediate portion is a wave form in which a center is in the form of a mount 120, both sides as valleys 21, 22, and the outer sides are mounts 21a, 22c to thereby a plate spring function can be achieved. The upper surface of the mount 120 is lower than the upper surface 13b of the bottom portion 13.

Reference numeral 115 denotes the end wall portion on both end portions of the bottom portion 13. Reference numerals 115a, 115b denote a projecting portion that is projected respectively from both ends of the bottom portion 13.

As illustrated in FIG. 25, the lid portion 34 of the holding member fixture 32 is threadably engaged for example on the base portion 33 of the holding member fixture 32 to thereby press the lid body 6 with the lid portion 34. As a result, the pressing portion 18 presses the laminated optical fiber ribbons 2 with a larger force by elasticity thereof than the resilient force, and then the optical fiber ribbons 2 can be fixed tightly.

Figure 43:
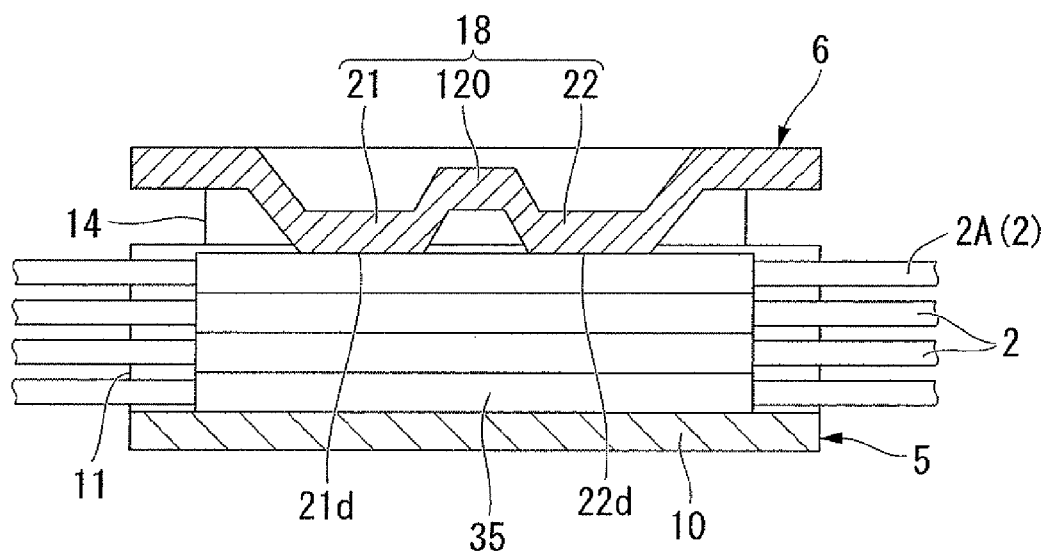
FIG. 43 illustrates a configuration in which the optical fiber ribbon is held without use of a pressure dispersion plate.

At this time, as shown in FIG. 43, if the pressure dispersion plate 7 is omitted, since the lower surfaces 21d, 22d of the valleys 21, 22 of the pressing portion 18 come into direct abutment, a large pressing force will become localized on the optical fiber ribbon 2 (2A) that is most proximate to the lid body side. As a result, in addition to the optical fiber ribbon 2A that is most proximate to the lid body side, a localized bending is also generated in other optical fiber ribbons 2 beside the optical fiber ribbon 2A, and insertion loss in the optical fiber ribbon holding member 101 is slightly increased.

In contrast, as illustrated in FIG. 22 to FIG. 24B, when a rigid pressure dispersion plate 7 is disposed between the pressing portion 18 and the optical fiber ribbon 2 that is most proximate to the lid body side, localized bending of the optical fiber ribbon 2 can be suppressed since the pressing force is dispersed without localized concentration, and therefore reduction in insertion loss in the optical fiber ribbon holding member 101 can be further improved.

Since the overall lower surfaces 21d, 22d of the pressing portion 18 abut with the upper surface 26b of the pressure dispersion plate main body 26, the length L1 in the insertion direction (Y direction) of the pressure dispersion plate main body 26 (refer to FIG. 5) may be larger than the distance L2 between both ends of the overall valleys 21b, 22b.

The length of the pressure dispersion plate main body 26 in a width direction (X direction) may be at least equal to the length of the optical fiber ribbon 2 in a width direction (X direction). The length of the pressure dispersion plate 7 may include a margin for enabling relative displacement with the lid body 6.

The pressure dispersion plate main body 26 has rigidity of a degree that does not produce a large deformation when a pressing force is applied by the pressing portion 18, and the lower surface 26c abuts with the optical fiber ribbon 2 (2A) that is most proximate to the lid body side.

As described above, this configuration enables the pressure dispersion plate main body 26 to disperse a large localized pressing force from the pressing portion 18 and to press the optical fiber ribbon 2 with a more equivalent pressing force. The thickness of the pressure dispersion plate main body 26 may be in a range between 0.05 mm to 0.5 mm.

As illustrated in FIG. 19, the pressure dispersion plate 7 includes a rectangular plate-shaped (or substantially plate-shaped) pressure dispersion plate main body 26, and side plate portions 27, 27 that stand upright from both side edges of the pressure dispersion plate main body 26. These side plate portions 27 are formed to be substantially vertical with respect to the pressure dispersion plate main body 26. In the example illustrated in FIG. 19, an engagement leg portion 25 (engagement portion) is also provided on the side plate portion 27, and the pressure dispersion plate 7 can be mounted on the lid body 6 by engagement of the engagement leg portion 25 with the lid body 6.

In the example shown in FIG. 23, the side plate portion 27 can be inserted into the slit 13a of the lid body 6.

The side plate portion 27 limits the relative displacement by making contact with the edge of the slit 13a. In other words, the side plate portion 27 and the lid body 6 (bottom portion 13) have a limiting structure that limits the relative displacement between the pressure dispersion plate 7 and the lid body 6. This limiting structure enables stabilization of the position and the orientation of the pressure dispersion plate 7.

As shown in FIG. 19, two engagement leg portions 25 are formed respectively on the upper edges 27a, 27a of both side plate portions 27, 27. The engagement leg portions 25, 25 of each side plate portion 27 exhibit plastic bending deformation to an inward direction at a position that corresponds with the respective valleys 21, 22 at an interval in the insertion direction (Y direction).

FIG. 19 illustrates an example of the configuration of the pressure dispersion plate 7 before deformation, and FIG. 20 shows the configuration of the pressure dispersion plate 7 after deformation.

The engagement leg portions 25, 25 of each side plate portion 27 can be engaged with the valleys 21, 22 by merely inward bending with the respective base end portions 25a. As a result, the pressure dispersion plate 7 can be simply and accurately mounted on the lid body 6.

The folded engagement leg portions 25, 25 abut with the mount on both sides of the valleys 21, 22 to thereby limit relative displacement in an insertion direction. In this case, the engagement leg portions 25 and the pressing portion 18 configure a limiting structure that limits the mutual relative displacement of the pressure dispersion plate 7 and the lid body 6.

As illustrated in FIG. 22, the holding of the optical fiber ribbon 2 by the optical fiber ribbon holding member 101 is effected by disposing the pressure dispersion plate 7 between the lid body 6 and the optical fiber ribbon 2 (the optical fiber ribbon 2A that is most proximate to the lid body side) after accommodating a plurality of ribbons 2 in an inner side of the holding member main body 5 in a laminated state.

Next, the plurality of optical fiber ribbons 2 is held between the holding member main body 5 and the lid body 6 by covering the holding member main body 5 with the lid body 6 such that the inner sides are mutually opposed.

Rubber tubes 35 may be respectively provided to cover the optical fiber ribbons 2.

Handling of the plurality of optical fiber ribbons 2 (optical fiber ribbon bundles) is facilitated by use of the optical fiber ribbon holding member 101.

As illustrated in FIG. 18 and FIG. 23, the first latch structure 16 of the two step latch structure 16, 17 includes an engaging click 11a provided in a central portion of the outer surface 11c of the wall portion 11 on both sides of the holding member main body 5 and an engaging recess 14a that is provided in a central portion of the wall portion 14 on both sides of the lid body 6 and engages with the engaging click 11a.

The first latch structure 16 is a first step latch structure which functions in the engagement configuration as illustrated in FIG. 23. At that time, the pressing portion 18 which also forms the bottom surface (top surface) of the lid body 6 presses the laminated optical fiber ribbons 2, and undergoes elastic deformation due to the reaction force from the optical fiber ribbons 2, a path for dispersal of that force is provided by the elastic deformation of the central mount 120.

When engaged by the first step latch structure 16, the laminated optical fiber ribbons 2 are slightly pressured to a level that does not cause wide positional deviation. Therefore, when the lid body 6 is engaged with the holding member main body 5 by the latch structure 16, the position of the optical fiber ribbons 2 can be adjusted.

As illustrated in FIG. 18 and FIG. 24, the second latch structure 17 is provided on both sides in the insertion direction of the first latch structure 16, and includes an engaging click 11b provided respectively on an outer surface 11c of the wall portions 11 on both sides of the holding member main body 5, and an engaging recess 14b provided on the wall portions 14 on both sides of the lid body 6, and that engages with the engaging click 11b.

The second latch structure 17 is a second step latch structure that functions in the engagement configuration illustrated in FIG. 24A when the lid body 6 is pressed further from the state illustrated in FIG. 23.

In this state, as illustrated in FIG. 25, the lid portion 34 of the holding member fixture 32 is threadably fixed to the base portion 33 of the holding member fixture 32. Therefore when the lid body 6 of the optical fiber ribbon holding member 101 is pressed further by the lid portion 34, the pressing portion 18 presses the laminated optical fiber ribbons 2 with a stronger elastic force, therefore the laminated optical fiber ribbons 2 can be fixed tightly.

FIG. 24B illustrates the state of the first latch structure 16 when the second latch structure 17 functions.

In the present embodiment, a rubber tube 35 covers each optical fiber ribbon 2 as shown in FIG. 23, FIG. 24A, and FIG. 24B. The rubber tube 35 has an anti-slip function between the optical fiber ribbons 2, and between the optical fiber ribbon 2 most proximate to the bottom portion side or most proximate to the lid body side and the bottom portion 10 of the holding member main body 5 or the pressing portion 18 of the lid body 6.

As illustrated in the example in the figure, although the rubber tube 35 covers all the optical fiber ribbons 2. However, when one of the optical fiber ribbons 2 that are vertically adjacent is covered by the rubber tube 35 with respect to the middle optical fiber ribbon 2 except the uppermost and the lowermost optical fiber ribbons, the anti-slip function is effectively operated, so that the rubber tube 35 can be omitted alternately.

In addition to a rubber tube, a rubber member such as a simple rubber sheet can be interposed between the optical fiber ribbons, or between the bottom portion 10 and the optical fiber ribbon most proximate to the bottom portion or between the top surface portion 13 and the optical fiber ribbon most proximate to the lid body.

During shipping of components, engagement with the first latch structure 16 is executed without deeply pressing the lid body 6. In this state, the optical fiber ribbons 2 are held by the optical fiber ribbon holding member 101 to a degree that the laminated optical fiber ribbons 2 are not widely misaligned, and are loosely held so that the position of the optical fiber ribbon 2 can be adjusted.

Figure 44:
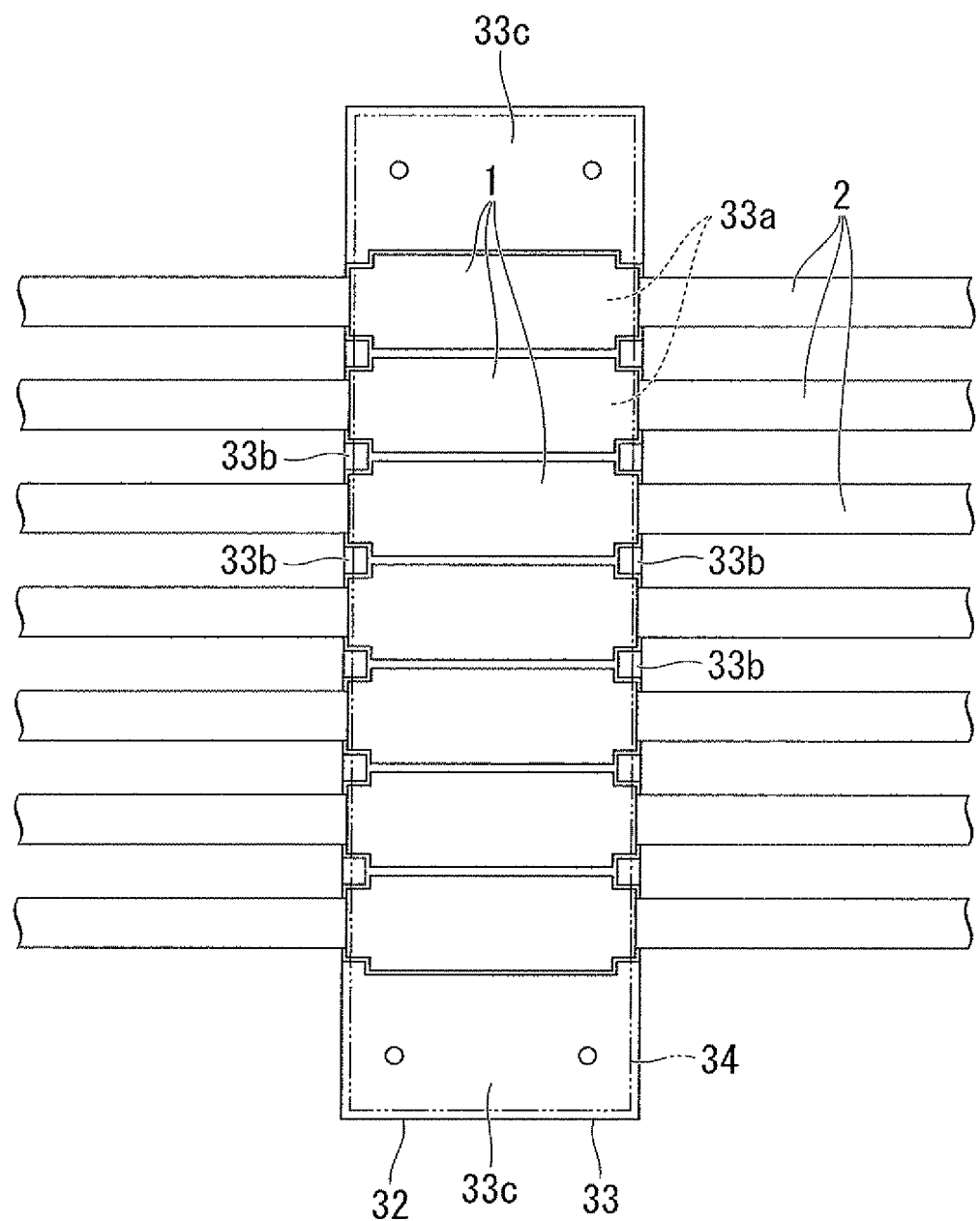
FIG. 44 is a plan view of a holding member fixture for fixing of the optical fiber ribbon holding member.

As shown in FIG. 25 and FIG. 44, when a user fixes the optical fiber ribbon holding member 101 that holds the laminated optical fiber ribbons 2 to the holding member fixture 32, each optical fiber ribbon holding member 101 is set to the holding member installation portion 33a provided on the base portion 33 of the holding member fixture 32.

The holding member installation portion 33a as illustrated in FIG. 44 is formed as a space defined by the posts 33b that are provided in an upright orientation on both width direction sides of both longitudinal ends of the optical fiber ribbon holding member 101 at the base 33. In a width direction, the four posts 33b enclosing a single optical fiber ribbon holding member 101 limit transverse displacement of both ends of the wall portions 11 of the holding member main body 5, and in a longitudinal direction, limit longitudinal displacement of both longitudinal ends of the wall portions 14 of the lid body 6, and thereby positional determination of the optical fiber ribbon holding member 101 can be determined The posts 33b being contact with the abutting projection 11e by the elastic force of the abutting piece 11d (refer to FIG. 18) of the holding member main body 5. The optical fiber ribbon holding member 101 is stably held on the holding member installation portion 33a since displacement in the direction of height (Z direction) of the optical fiber ribbon holding member 101 is limited by friction between the abutting projection 11e and the posts 33b.

Next, the lid portion 34 of the holding member fixture 32 is threadably engaged with the lid fixing portion 33c of the base portion 33 (refer to FIG. 44), and fixes the optical fiber ribbon holding member 101 to the holding member fixture 32.

At this time, the optical connector 3 mounted on each optical fiber ribbon 2 held by the optical fiber ribbon holding member 101 is installed with high positional accuracy on the designated mounting position on the substrate 29.

When the position of the optical connector 3 diverges from the designated mounting position, the first step of the latch structure 16 is loosely engaged to a level that enables adjustment of the ribbons 2, and therefore readjustment of the position of the laminated optical fiber ribbons 2 is enabled by removing the optical fiber ribbon holding member 101 from the holding member fixture 32, and releasing the second step of the latch structure 17 without removing the lid body 6 that is engaged with the first step latch structure 16.

In this manner, the optical fiber ribbon holding member 101 facilitates optical fiber ribbon stacking and holding operations by holding the optical fiber ribbons 2 by merely an operation of covering with the lid body 6.

Furthermore, since positional readjustment of the ribbons 2 is enabled by releasing the second step latch structure 17 without removing the lid body 6 that is engaged with the first step latch structure 16, therefore readjustment operations of optical fiber ribbon are simplified.

Since operations are simplified due to omission of a heating operation such as that used in a conventional heat shrinkable tube, and positional readjustment of the optical fiber ribbon is enabled with a detachable lid body, even when components are shipped without highly accurate positional determination, a user can execute simple and highly accurate positioning, thereby the optical fiber ribbon can be laminated and held.

Although the optical fiber ribbon pressing portion 18 according to the present embodiment is configured by forming the shape of the top surface portion 13 of the lid body 6 as a plate spring, the invention is not limited thereby, and for example, another configuration such as attachment of a rubber sheet to an inner surface of a flat top surface portion may be employed.

Eighth Embodiment

An eighth embodiment of the optical fiber ribbon holding member 41 will be described below.

In the following description of each embodiment, those features that have already been described above will be denoted by the same reference numerals and such description will not be repeated.

Figure 26:
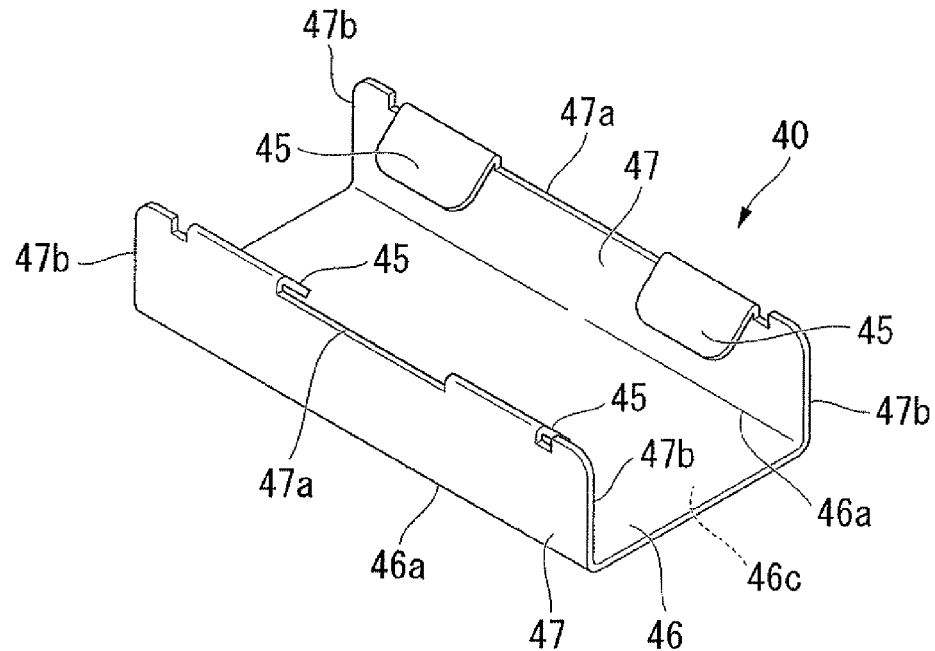
FIG. 26 is a perspective view showing the pressure dispersion plate used in an eighth embodiment of the optical fiber ribbon holding member according to the present invention.
Figure 27:
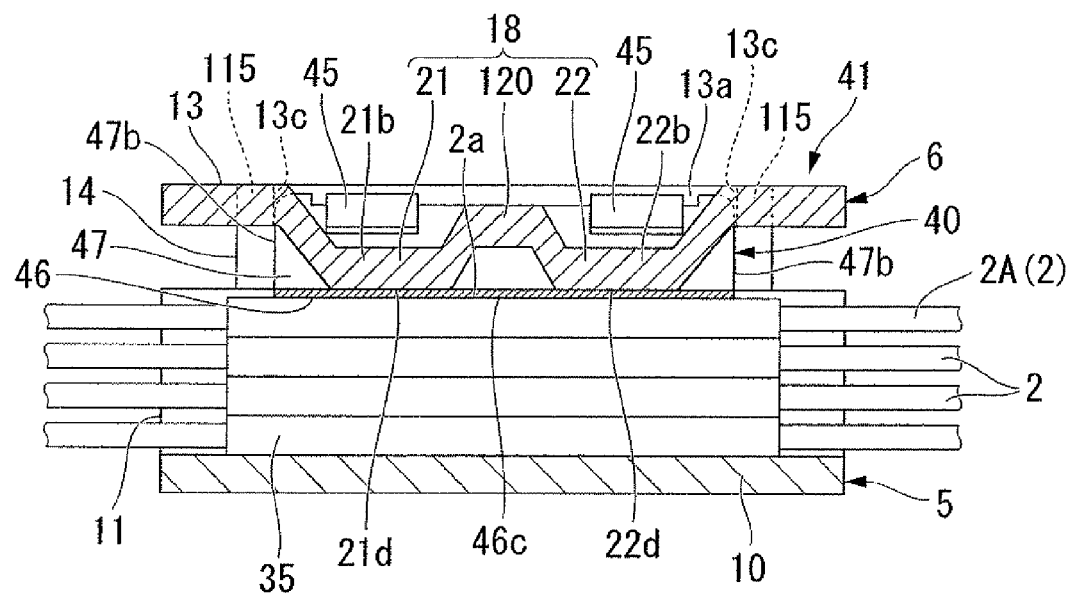
FIG. 27 is a schematic view showing a longitudinal sectional view of the optical fiber ribbon holding member according to the eighth embodiment.

FIG. 26 is a perspective view showing the pressure dispersion plate 40 for the optical fiber ribbon holding member 41. FIG. 27 is a schematic longitudinal sectional view of the optical fiber ribbon holding member 41.

The optical fiber ribbon holding member 41 according to the present embodiment has the same configuration as the optical fiber ribbon holding member 101 as illustrated in FIG. 18 with the exception that a pressure dispersion plate 40 is used in substitution for the pressure dispersion plate 7.

As illustrated in FIG. 26, the pressure dispersion plate 40 includes a rectangular plate-shaped pressure dispersion plate main body 46, and a side plate portion 47 that projects from the side edge 46a of the pressure dispersion plate main body 46 in a substantially vertical orientation relative to the pressure dispersion plate main body 46, and an engaging click 45 that is formed on an upper edge 47a of the side plate portion 47.

The pressure dispersion plate main body 46 has rigidity of a degree that does not produce a large deformation when a pressing force is applied by the pressing portion 18, and thereby the lower surface 46c abuts with the optical fiber ribbon 2 (2A) that is most proximate to the lid body side.

Two engagement leg portions 45 are formed respectively on the upper edges 47a, 47a of both side plate portions 47, 47.

The engagement leg portions 45, 45 of each side plate portion 47 are formed at an interval in the insertion direction (Y direction) at a position corresponding to the respective valleys 21, 22 to extend inwardly with an inclination and thereby approach the pressure dispersion plate main body 46.

The engagement of the engaging click portions 45 with the valleys 21, 22 limits relative displacement in an insertion direction of the pressure dispersion plate 40 and the lid body 6.

The engaging click 45 can undergo elastic bending deformation.

According to this configuration, when mounting the pressure dispersion plate 40 on the pressing portion 18 from a lower surface, the engaging click 45 undergoes a bending deformation in a direction of folding and passes over the pressing portion 18, and then is returned by an elastic force to thereby limit the displacement of the pressure dispersion plate 40. As a result, the operation of mounting the pressure dispersion plate 40 is facilitated.

The side plate portion 47 can be inserted into the slit 13a.

In the example illustrated in FIG. 27, the side plate portion 47 is formed so that the displacement in an insertion direction is limited by abutment of the end edges 47b (displacement limiting portion) with the edge 13c on both ends of the slit 13a. In this manner, the side plate portion 47 of the pressure dispersion plate 40 and the bottom portion 13 of the lid body 6 configure a limiting structure that limits mutual relative displacement with respect to the insertion direction (Y direction).

This limiting structure enables stabilization of the position and the orientation of the pressure dispersion plate 40.

The constituent material used in the pressure dispersion plate 40 is a material that enables elastic bending deformation, in other words, a metal such as stainless steel, a resin, or the like may be used.

As illustrated in FIG. 27, when the pressure dispersion plate main body 46 is disposed between the pressing portion 18 of the lid body 6 and the optical fiber ribbon 2 (2A) that is most proximate to the lid body side, the force applied by the pressing portion 18 to the optical fiber ribbons 2 becomes dispersed and is not concentrated in a localized configuration, and therefore bending loss of the optical fiber ribbons 2 can be suppressed and a reduction in insertion loss can be further improved.

Ninth Embodiment

The optical fiber ribbon holding member 51 according to the ninth embodiment will be described below.

Figure 28:
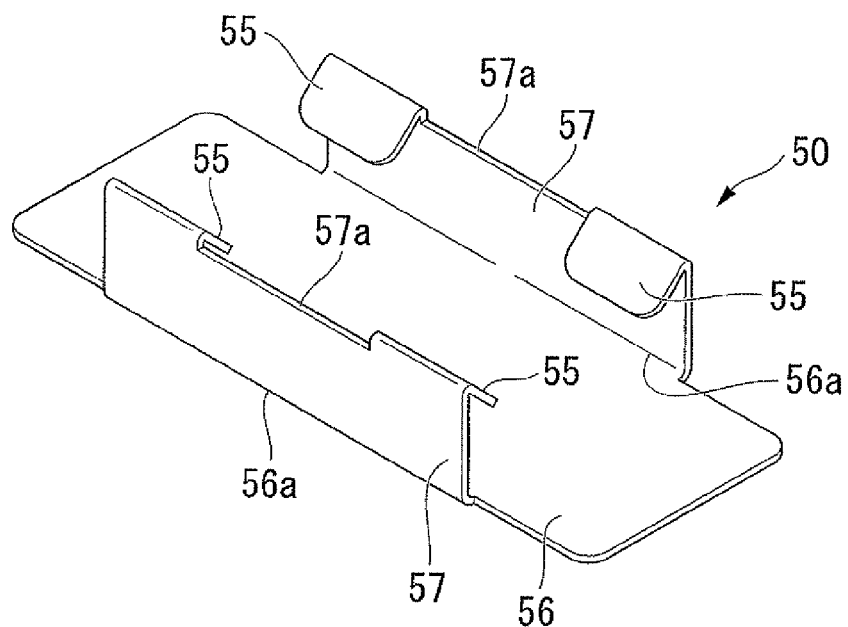
FIG. 28 is a perspective view showing the pressure dispersion plate used in a ninth embodiment of the optical fiber ribbon holding member according to the present invention.
Figure 29:
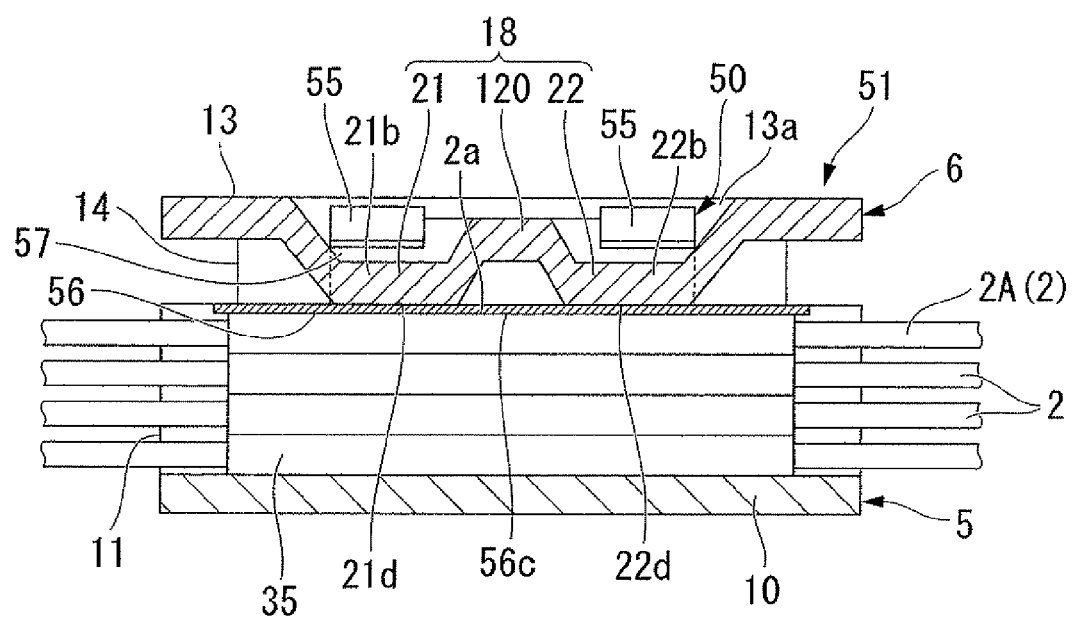
FIG. 29 is a schematic view showing a longitudinal sectional view of an optical fiber ribbon holding member according to the ninth embodiment.

FIG. 28 is a perspective view showing the pressure dispersion plate 50 of the optical fiber ribbon holding member 51. FIG. 29 is a schematic longitudinal sectional view of an optical fiber ribbon holding member 51.

The optical fiber ribbon holding member 51 according to the present embodiment has the same configuration as the optical fiber ribbon holding member 101 as illustrated in FIG. 18 with the exception that the pressure dispersion plate 50 is used in substitution for the pressure dispersion plate 7.

As illustrated in FIG. 28, the pressure dispersion plate 50 includes a rectangular plate-shaped pressure dispersion plate main body 56, a side plate portion 57 that projects from the side edge 56a of the pressure dispersion plate main body 56 in a substantially vertical orientation relative to the pressure dispersion plate main body 56, and an engaging click 55 that is formed on an upper edge 57a of the side plate portion 57.

The pressure dispersion plate main body 56 has rigidity of a degree that does not produce a large deformation when a pressing force is applied by the pressing portion 18, and thereby the lower surface 56c abuts with the optical fiber ribbon 2 (2A) that is most proximate to the lid body side.

The engaging click 55 has the same configuration as the engaging click 45 as shown in FIG. 26 and FIG. 27, enables elastic bending deformation, and extends inwardly with an inclination to thereby approach the pressure dispersion plate main body 56. Two engaging clicks 55 are respectively formed on the upper edges 57a, 57a of both side plate portions 57, 57.

As illustrated in FIG. 29, the engaging click portions 55 engage with the valleys 21, 22 to thereby limit relative displacement in an insertion direction of the pressure dispersion plate 50 and the lid body 6.

In comparison to the pressure dispersion plate 40 as illustrated in FIG. 26 and FIG. 27, the pressure dispersion plate main body 56 of the pressure dispersion plate 50 is elongated in the insertion direction.

Consequently, even when a positional deviation is produced in the insertion direction, the optical fiber ribbons 2 can be certainly held.

The constituent material used in the pressure dispersion plate 50 is a material that enables elastic bending deformation, in other words, a metal such as stainless steel, a resin, or the like may be used.

As illustrated in FIG. 29, when a pressure dispersion plate main body 56 is disposed between the pressing portion 18 of the lid body 6 and the optical fiber ribbon 2 (2A) that is most proximate to the lid body side, the force applied by the pressing portion 18 to the optical fiber ribbons 2 becomes dispersed and is not concentrated in a localized configuration, and therefore bending loss of the optical fiber ribbon 2 can be suppressed and a reduction in insertion loss can be further improved.

Tenth Embodiment

The optical fiber ribbon holding member 61 according to the tenth embodiment will be described below.

Figure 30:
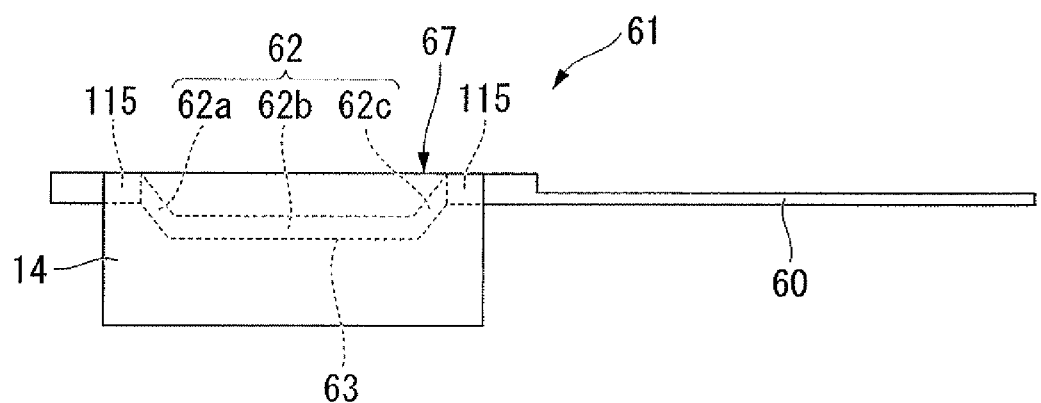
FIG. 30 is a lateral view showing a lid body and a pressure dispersion plate used in a tenth embodiment of the optical fiber ribbon holding member according to the present invention.
Figure 31:
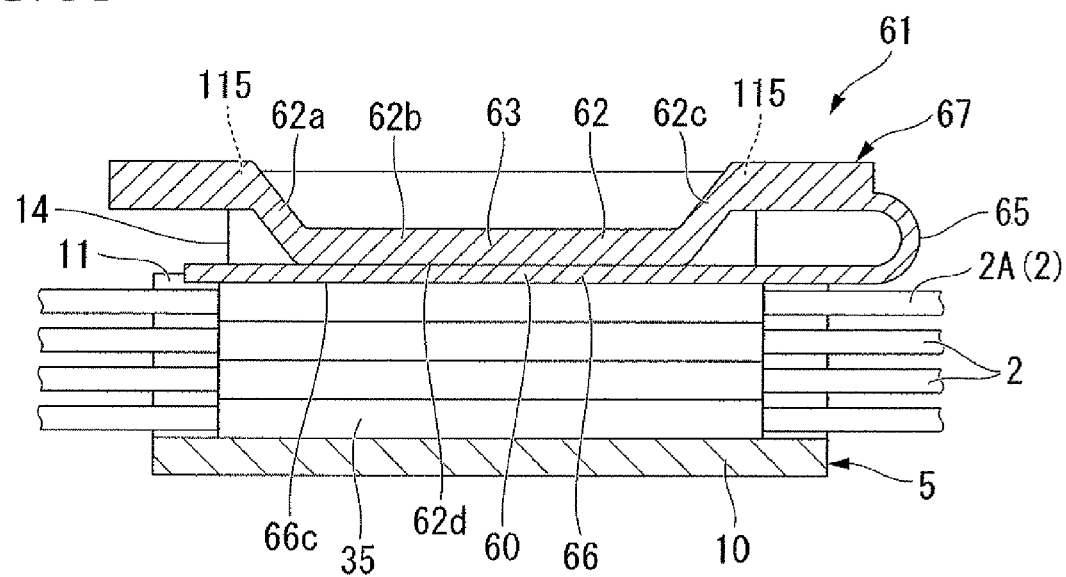
FIG. 31 is a schematic longitudinal sectional view of the optical fiber ribbon holding member according to the tenth embodiment.

FIG. 30 is a schematic view showing a lid body 67 of the optical fiber ribbon holding member 61 and a pressure dispersion plate 60 in an undeformed state integrally connected with the lid body 67 and extending from one end of the lid body 67. FIG. 31 is a schematic longitudinal sectional view of an optical fiber ribbon holding member 61.

The optical fiber ribbon holding member 61 according to the present embodiment has the same configuration as the optical fiber ribbon holding member 101 as illustrated in FIG. 18 with the exception that the pressure dispersion plate 60 and the lid body 67 are used in substitution for the pressure dispersion plate 7 and the lid body 6.

The lid body 67 has the same configuration as the lid body 6 of the optical fiber ribbon holding member 101 illustrated in FIG. 18 with the exception that a pressing portion 63 that includes one valley 62 is used in substitution for the pressing portion 18.

The valley 62 is configured by forming respective mounts 62a, 62c on one end and the other end of the valley 62b, and obtains a plate spring function in the same manner as the pressing portion 18 according to the seventh embodiment.

As illustrated in FIG. 30, the pressure dispersion plate 60 can be configured as an elongated plate with substantially a fixed width to extend from one end of the bottom portion 13. The pressure dispersion plate 60 is integrally formed with the lid body 67, and can undergo bending deformation.

As illustrated in FIG. 31, the pressure dispersion plate 60 is disposed in a laminated configuration on the lower surface 62b of the valley 62b by bending downwardly with the bending portion 65 in proximity to the base end.

In the configuration shown in the figure, portions other than the bending portion 65 of the pressure dispersion plate 60 are denoted as the plate-shaped pressure dispersion plate main body 66. The pressure dispersion plate main body 66 has rigidity of a degree that does not produce a large deformation when a pressing force is applied by the pressing portion 63, and the lower surface 66c abuts with the optical fiber ribbon 2 (2A) that is most proximate to the lid body.

When the pressure dispersion plate main body 66 is disposed between the pressing portion 63 of the lid body 6 and the optical fiber ribbon 2 (2A) that is most proximate to the lid body side, the force from the pressing portion 63 is applied to the optical fiber ribbons 2 without becoming concentrated in a localized configuration, and therefore bending loss of the optical fiber ribbons 2 can be suppressed and a reduction in insertion loss can be further improved.

Since the pressure dispersion plate 60 is integrally formed with the lid body 67, manufacture is simplified by reducing the number of components and reducing the number of assembly operations, and moreover costs can be reduced.

The constituent material used in the pressure dispersion plate 64 is a material that enables bending deformation, in other words, a metal such as stainless steel, a resin, or the like may be used.

Eleventh Embodiment

The optical fiber ribbon holding member 71 according to the eleventh embodiment will be described below.

Figure 32:
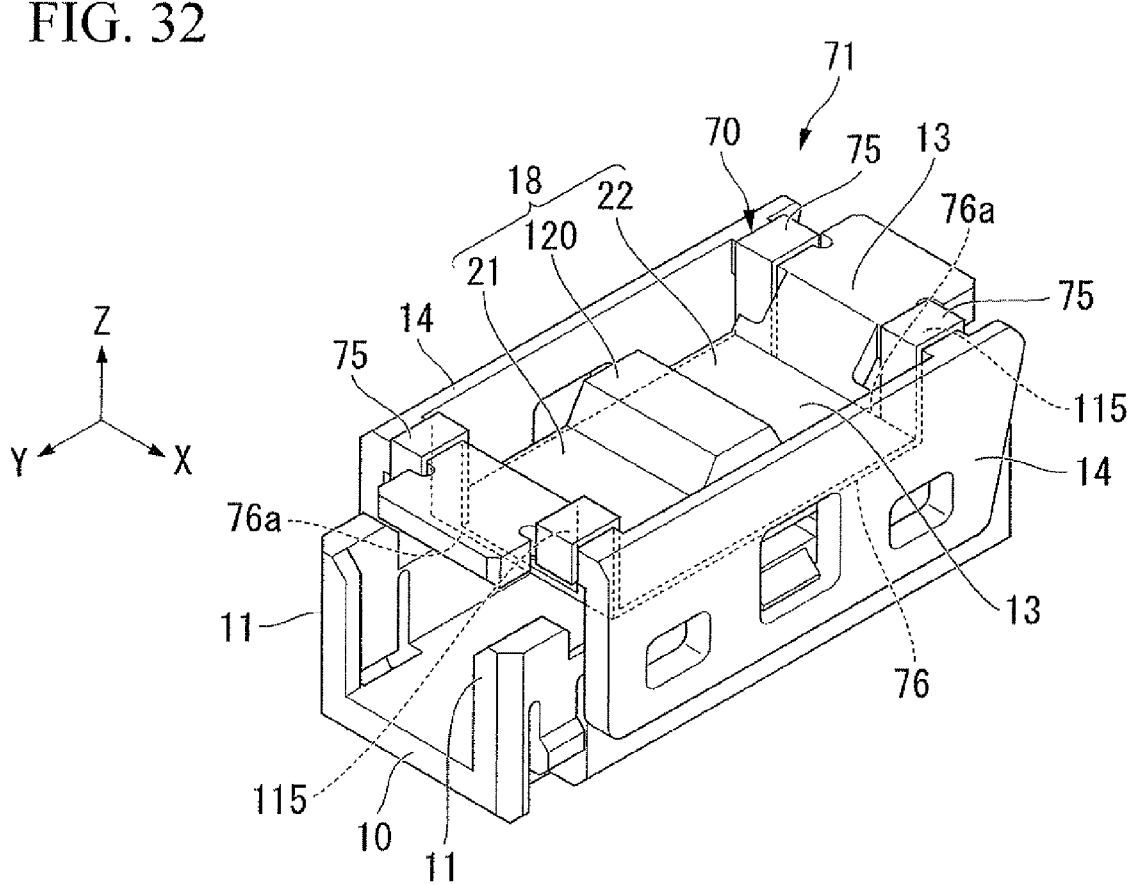
FIG. 32 is a perspective view illustrating an eleventh embodiment of the optical fiber ribbon holding member according to the present invention.
Figure 33:
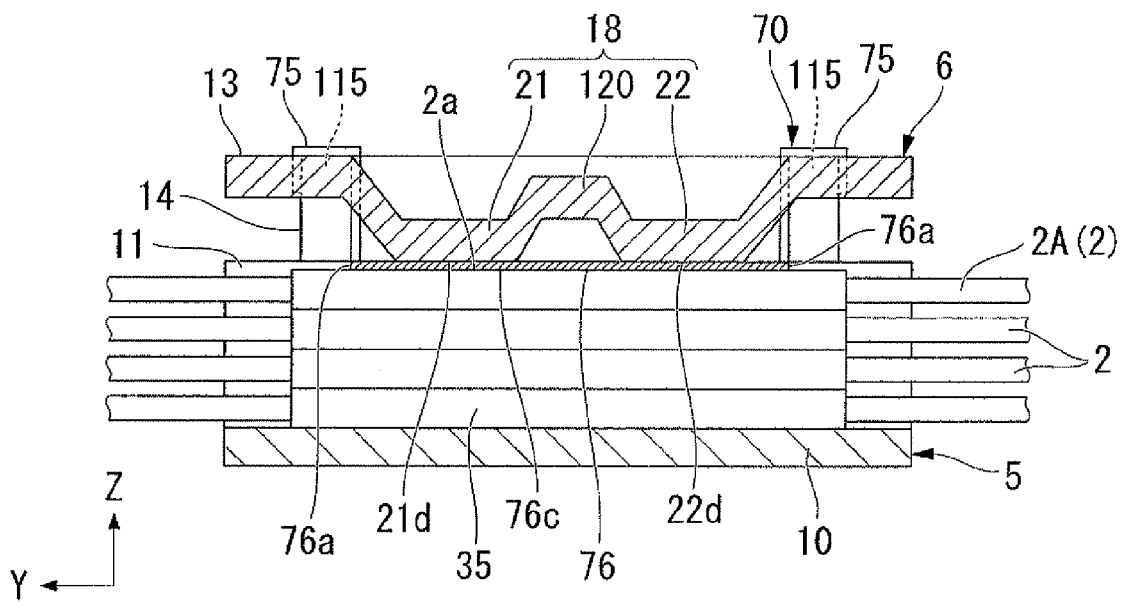
FIG. 33 is a schematic longitudinal sectional view of the optical fiber ribbon holding member according to the eleventh embodiment.

FIG. 32 is a perspective view illustrating the optical fiber ribbon holding member 71. FIG. 33 is a schematic longitudinal sectional view of an optical fiber ribbon holding member 51.

The optical fiber ribbon holding member 71 according to the present embodiment has the same configuration as the optical fiber ribbon holding member 101 as illustrated in FIG. 18 with the exception that the pressure dispersion plate 70 is used in substitution for the pressure dispersion plate 7.

The pressure dispersion plate 70 includes a rectangular plate-shaped pressure dispersion plate main body 76, and an engagement leg portion 75 (engagement portion) that extends from the pressure dispersion main body 76.

The pressure dispersion plate main body 76 has rigidity of a degree that does not produce a large deformation when a pressing force is applied by the pressing portion 18, and thereby the lower surface 76c abuts with the optical fiber ribbon 2 (2A) that is most proximate to the lid body side.

As shown in FIG. 32, two engagement leg portions 75 are formed respectively on both end edges 76a, 76a of the pressure dispersion plate main body 76.

The engagement leg portions 75, 75 of each end edge 76a are formed at an interval in a width direction (X direction), extend upwardly along the slit 13a and are engaged to the end wall portion 115 to thereby position the pressure dispersion plate 70 with respect to the pressing portion 18.

The engagement leg portions 75 exhibit plastic bending deformation, and are mounted on the lid body 6 by bending deformation and engagement with the end wall portion 115. As a result, the pressure dispersion plate 70 can be accurately mounted on the lid body 6 with a simple operation.

The constituent material used in the pressure dispersion plate 70 is a material that enables bending deformation, in other words, a metal such as stainless steel, a resin, or the like may be used.

When the pressure dispersion plate main body 76 is disposed between the pressing portion 18 of the lid body 6 and the optical fiber ribbon 2 (2A) that is most proximate to the lid body side, the force from the pressing portion 18 is applied to the optical fiber ribbons 2 without becoming concentrated in a localized configuration, and therefore bending loss of the optical fiber ribbon 2 can be suppressed and a reduction in insertion loss can be further improved.

Twelfth Embodiment

Figure 34:
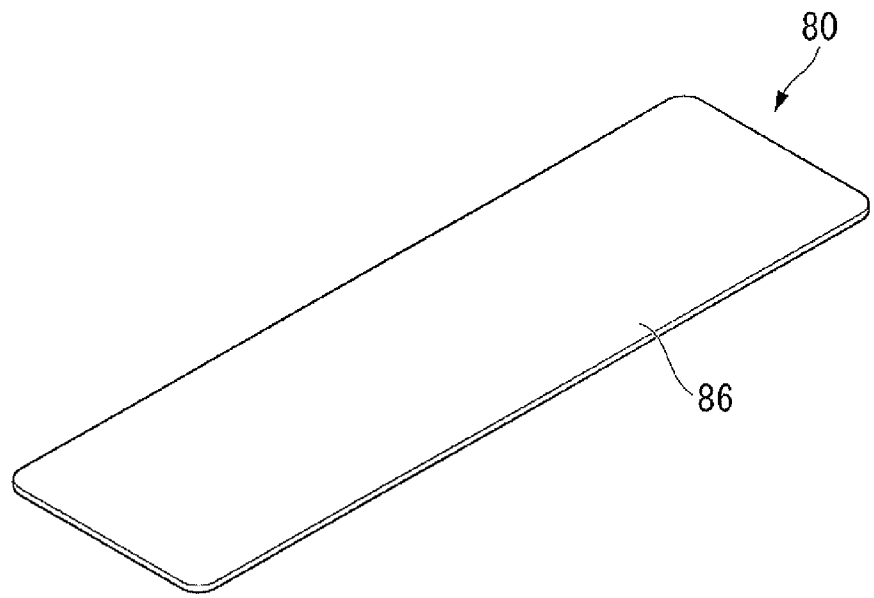
FIG. 34 is a perspective view showing a pressure dispersion plate used in a twelfth embodiment of the optical fiber ribbon holding member according to the present invention.
Figure 35:
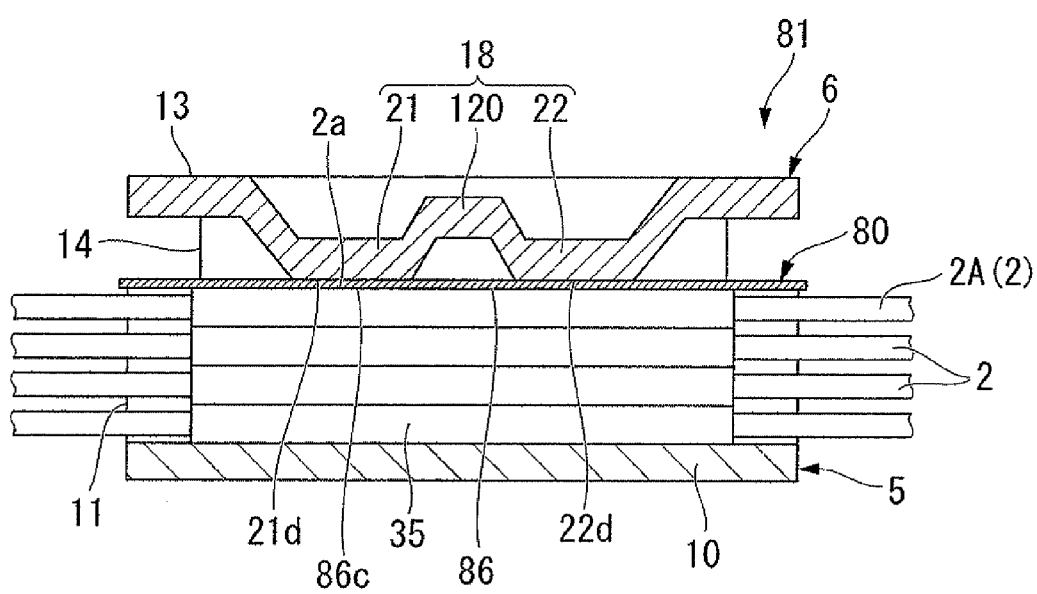
FIG. 35 is a schematic longitudinal sectional view of the optical fiber ribbon holding member according to the twelfth embodiment.

FIG. 34 is a perspective view showing a pressure dispersion plate 80 used in the optical fiber ribbon holding member 81 according to the twelfth embodiment. FIG. 35 is a schematic longitudinal sectional view of an optical fiber ribbon holding member 81.

The pressure dispersion plate 80 includes a rectangular plate-shaped pressure dispersion main body 86.

The pressure dispersion plate main body 86 has rigidity of a degree that does not produce a large deformation when a pressing force is applied by the pressing portion 18, and thereby the lower surface 86c abuts with the optical fiber ribbon 2 (2A) that is most proximate to the lid body side.

The constituent material used in the pressure dispersion plate 80 is a metal such as stainless steel, a resin, a ceramic or the like.

In the present embodiment, since the pressure dispersion plate 80 has a simple configuration, cost reductions can be enabled.

Thirteenth Embodiment

Figure 36:
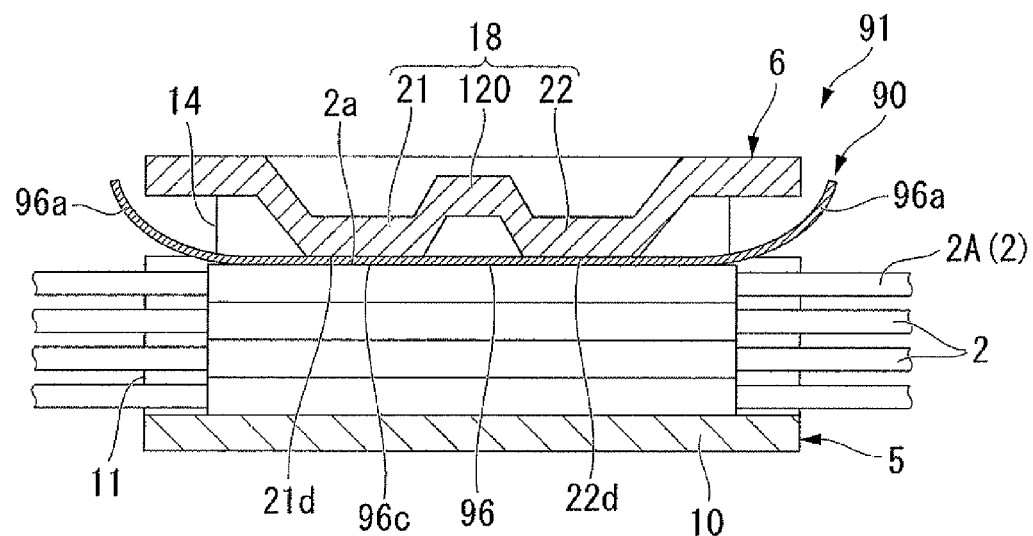
FIG. 36 is a schematic longitudinal sectional view of the optical fiber ribbon holding member according to a thirteenth embodiment.

FIG. 36 is a schematic longitudinal sectional view of an optical fiber ribbon holding member 91 according to the thirteenth embodiment.

The pressure dispersion plate 90 used in the optical fiber ribbon holding member 91 includes a pressure dispersion plate main body 96 formed as a rectangular plate, and an end curved portion 96a on both ends in the insertion direction. The end curved portion 96a is bent upwardly (in a direction of separation from the holding member main body 5).

The pressure dispersion plate main body 96 has rigidity of a degree that does not produce a large deformation when a pressing force is applied by the pressing portion 18, and thereby the lower surface 96c abuts with the optical fiber ribbon 2 (2A) that is most proximate to the lid body side.

In this configuration, localized bending to the optical fiber ribbon 2 from the end of the pressure dispersion plate 90 can be prevented.

The constituent material used in the pressure dispersion plate 90 is a metal such as stainless steel, a resin, or the like.

Fourteenth Embodiment

Figure 37:
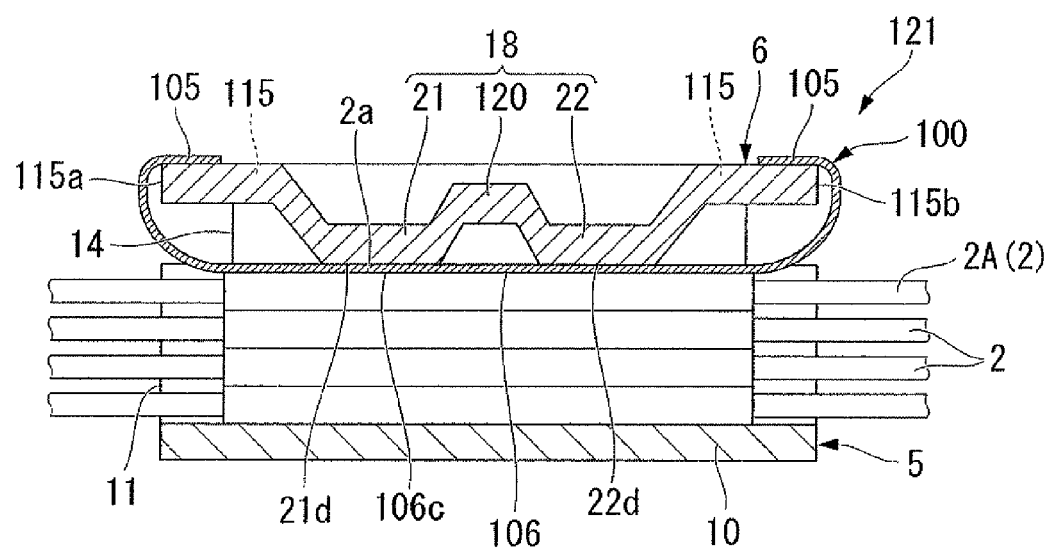
FIG. 37 is a schematic longitudinal sectional view of the optical fiber ribbon holding member according to a fourteenth embodiment.

FIG. 37 is a schematic longitudinal sectional view of an optical fiber ribbon holding member 121 according to the fourteenth embodiment.

The pressure dispersion plate 100 used in the optical fiber ribbon holding member 121 includes a pressure dispersion plate main body 106 formed as a rectangular plate, and an engagement portion 105 on both ends in the insertion direction.

The pressure dispersion main body 106 has rigidity of a degree that does not produce a large deformation when a pressing force is applied by the pressing portion 18, and thereby the lower surface 106c abuts with the optical fiber ribbon 2 (2A) that is most proximate to the lid body side.

The engagement portion 105 is engaged to bend upwardly from both ends of the pressure dispersion main body 106, and is wound from an outer position onto the projection portions 115a, 115b of the lid body 6. The engagement position of the engagement portion 105 is not limited to the example shown in the figure, but may be configured at any position on the bottom portion 13 (top surface portion).

The constituent material used in the pressure dispersion plate 100 is a metal such as stainless steel, a resin, or the like.

Fifteenth Embodiment

In each of the embodiments, the pressure dispersion plate main body for the pressure dispersion plate is disposed on an external surface of the rubber tube for the optical fiber ribbons, but the present invention may dispose the pressure dispersion plate main body between the rubber tube and the optical fiber ribbons.

Figure 38:
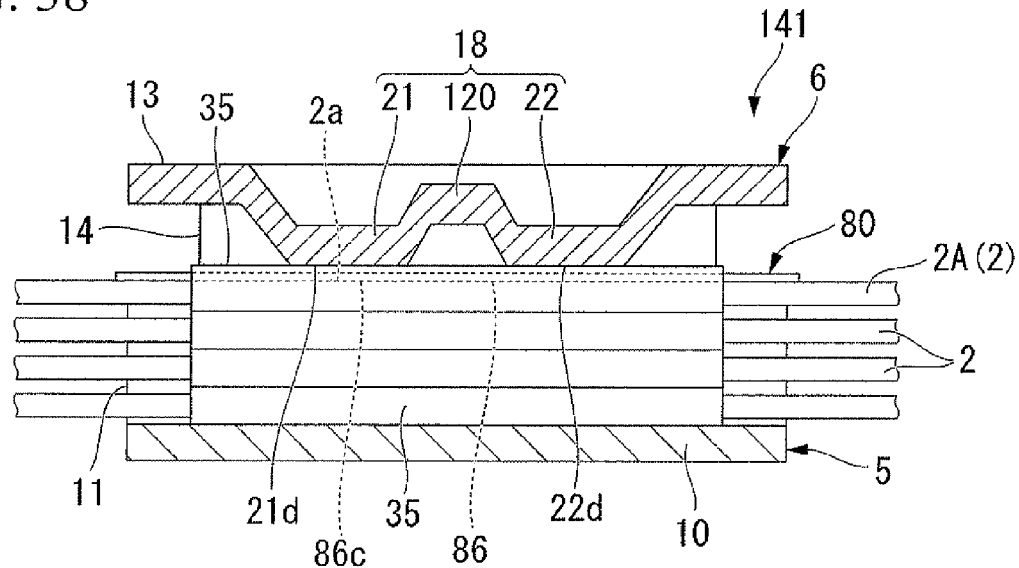
FIG. 38 is a schematic longitudinal sectional view of the optical fiber ribbon holding member according to a fifteenth embodiment.

FIG. 38 is a schematic longitudinal sectional view of an optical fiber ribbon holding member 141 according to the fifteenth embodiment.

The optical fiber ribbon holding member 141 differs from the optical fiber ribbon holding member 81 illustrated in FIG. 35 in that the pressure dispersion plate 80 being disposed between the optical fiber ribbon 2A most proximate to the lid body side and the rubber tube 35 covering the optical fiber ribbon 2A.

When holding the optical fiber ribbons 2 using the optical fiber ribbon holding member 141, the pressure dispersion plate 80 is disposed between the optical fiber ribbon 2A most proximate to the lid body side among the optical fiber ribbons 2 which is accommodated in the holding member main body 5, and the rubber tube 35 covering the optical fiber ribbon 2A, and then the holding member main body 5 is covered with the lid body 6.

Sixteenth Embodiment

Figure 39A:
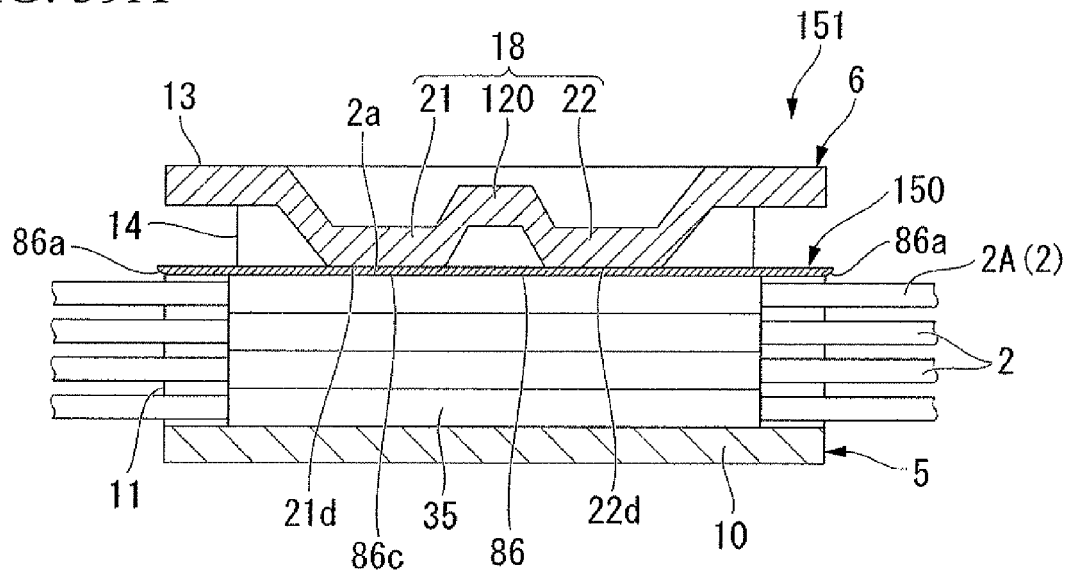
FIG. 39A is a schematic longitudinal sectional view of the optical fiber ribbon holding member, and shows the optical fiber ribbon holding member according to a sixteenth embodiment.
Figure 39B:
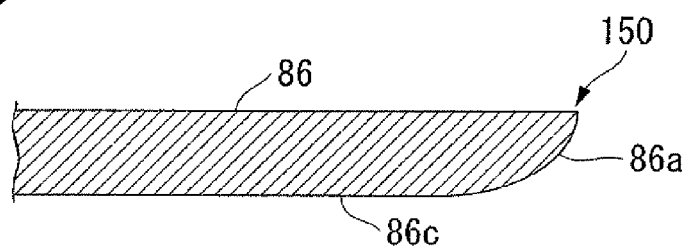
FIG. 39B is an enlarged sectional view of an end portion of the pressure dispersion plate for the optical fiber ribbon holding member illustrated in FIG. 39A.

FIG. 39 illustrates the optical fiber ribbon holding member 151 according to a sixteenth embodiment. FIG. 39A is a schematic longitudinal sectional view of an optical fiber ribbon holding member 151, and FIG. 39B is an enlarged sectional view of an end portion 86a of a pressure dispersion plate 150.

The pressure dispersion plate 150 of the optical fiber ribbon holding member 151 has a shape in which the lower surface 86c (the surface near to the optical fiber ribbon 2 side) of both ends 86a in the insertion direction of the pressure dispersion plate main body 86 becomes progressively rounded and separates from the optical fiber ribbon 2 towards the distal end. The lower surface 86c of both end portions 86a in the example in the figure is formed as a curve that has an arc shaped sectional profile.

In this configuration, localized bending to the optical fiber ribbon 2 from the end of the pressure dispersion plate 150 can be prevented.

Figure 40:
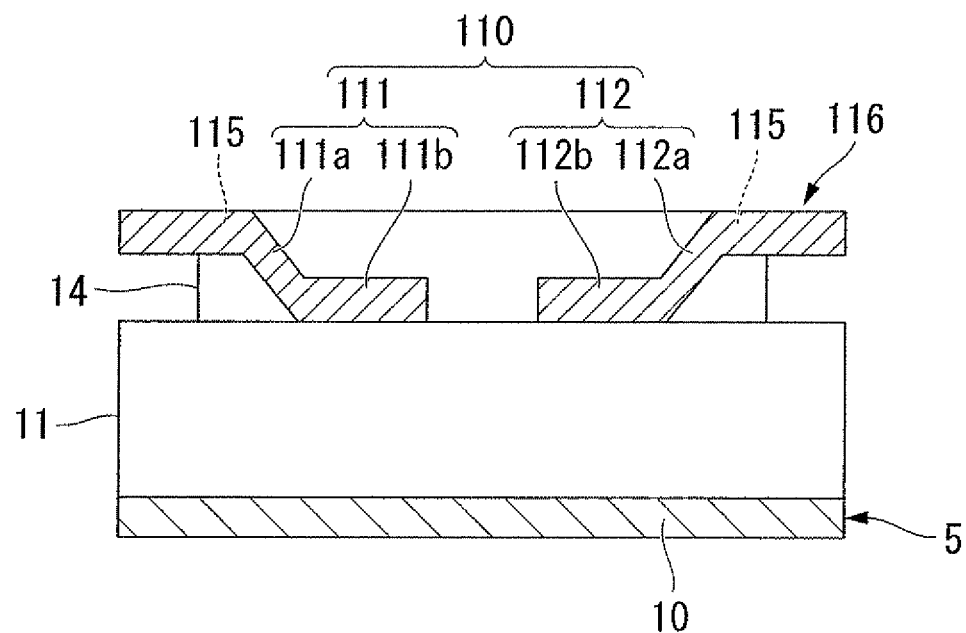
FIG. 40 is a schematic longitudinal sectional view according to a first modified example of the optical fiber ribbon holding member.
Figure 41:
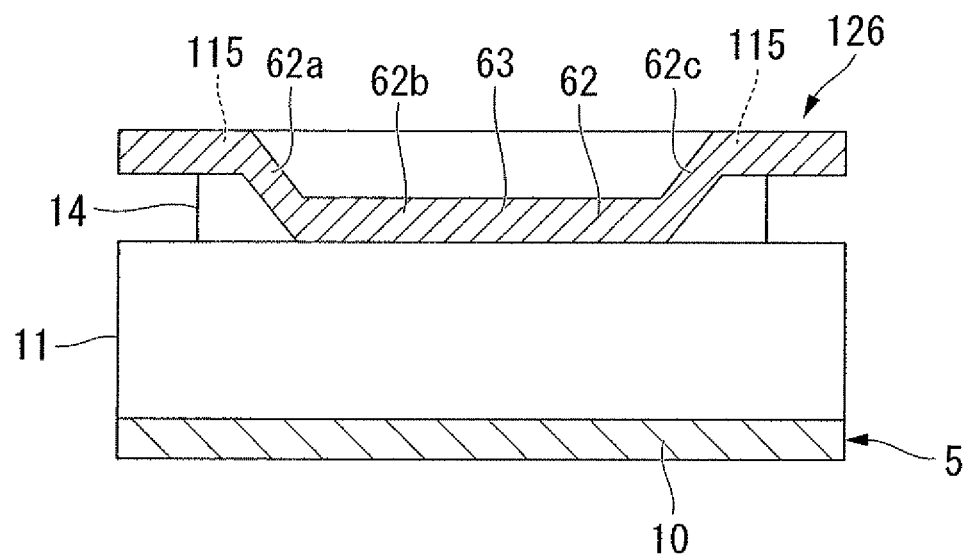
FIG. 41 is a schematic longitudinal sectional view according to a second modified example of the optical fiber ribbon holding member.
Figure 42:
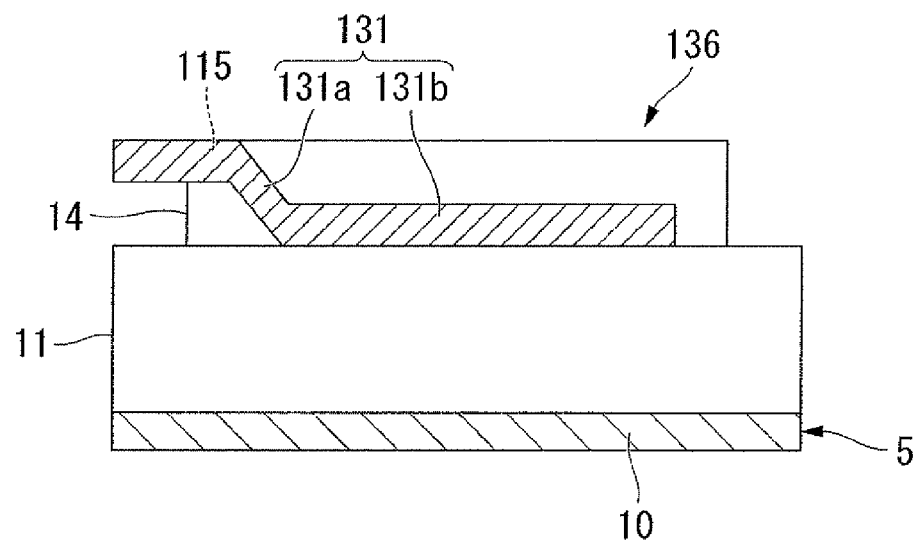
FIG. 42 is a schematic longitudinal sectional view according to a third modified example of the optical fiber ribbon holding member.

FIG. 40 to FIG. 42 show modified examples of the pressing portion for the lid body. The pressing portion 110 of the lid body 116 shown in FIG. 40 includes extending portions 111, 112 that respectively extend from the end wall portion 115.

The extending portions 111 includes a mount 111a that descends in the other end direction (the right direction in FIG. 40) from the end wall portion 115 on one end side, and a valley 111b that extends horizontally in the other end direction from the lower end of the mount 111a.

The extending portions 112 includes a mount 112a that descends in the other end direction (the left direction in FIG. 40) from the end wall portion 115 on one end, and a valley 112b that extends horizontally in the other end direction from the lower end of the mount 112a.

The pressing portion 63 of the lid body 126 illustrated in FIG. 41 includes one valley 62, and the valley 62 forms respective mounts 62a, 62c on one end and the other end of the valley 62b (bottom portion).

The pressing portion 131 of the lid body 136 illustrated in FIG. 42 includes a mount 131a that extends and descends in the other end direction (right direction in FIG. 42) from the end portion 115 on one end, and a valley 131b that extends horizontally in the other end direction from the lower end of the mount 131a.

Seventeenth Embodiment

Figure 45:
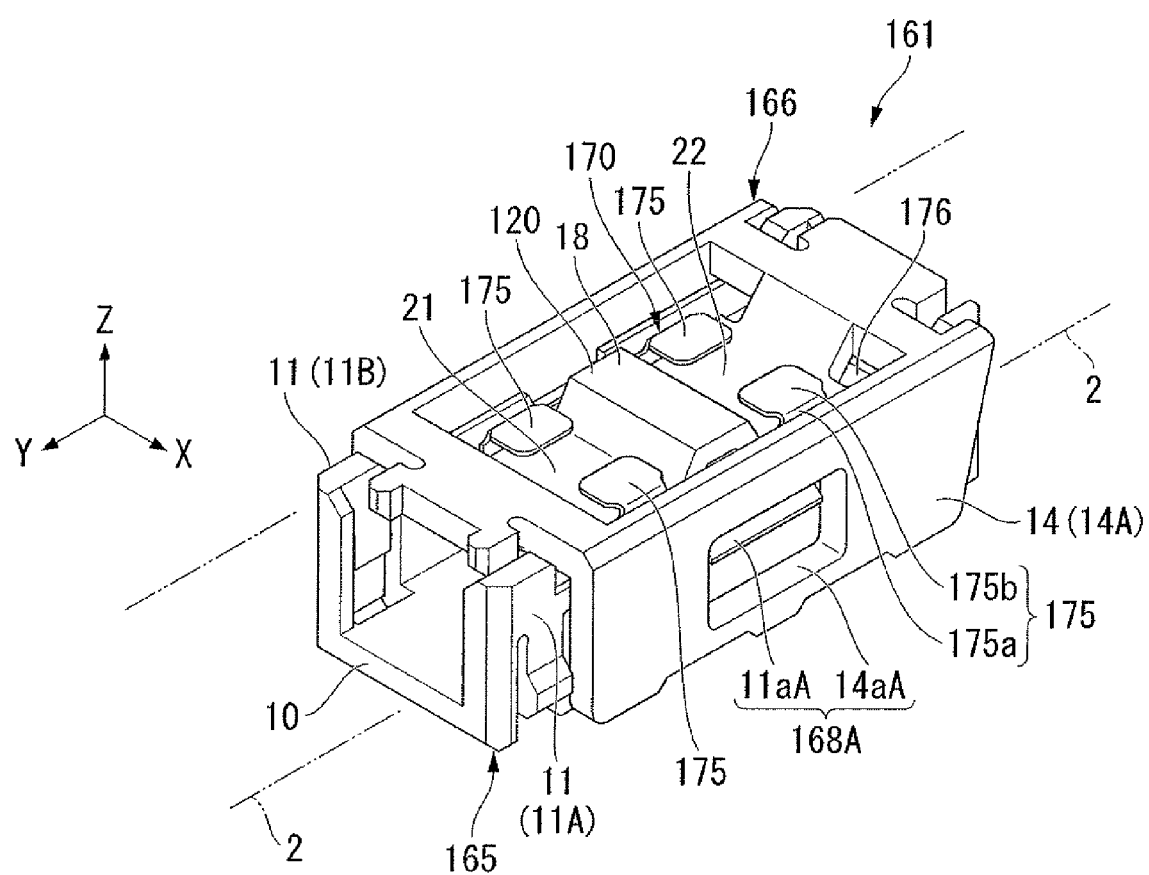
FIG. 45 is a perspective view of an optical fiber ribbon holding member according to a seventeenth embodiment of the present invention.
Figure 46:
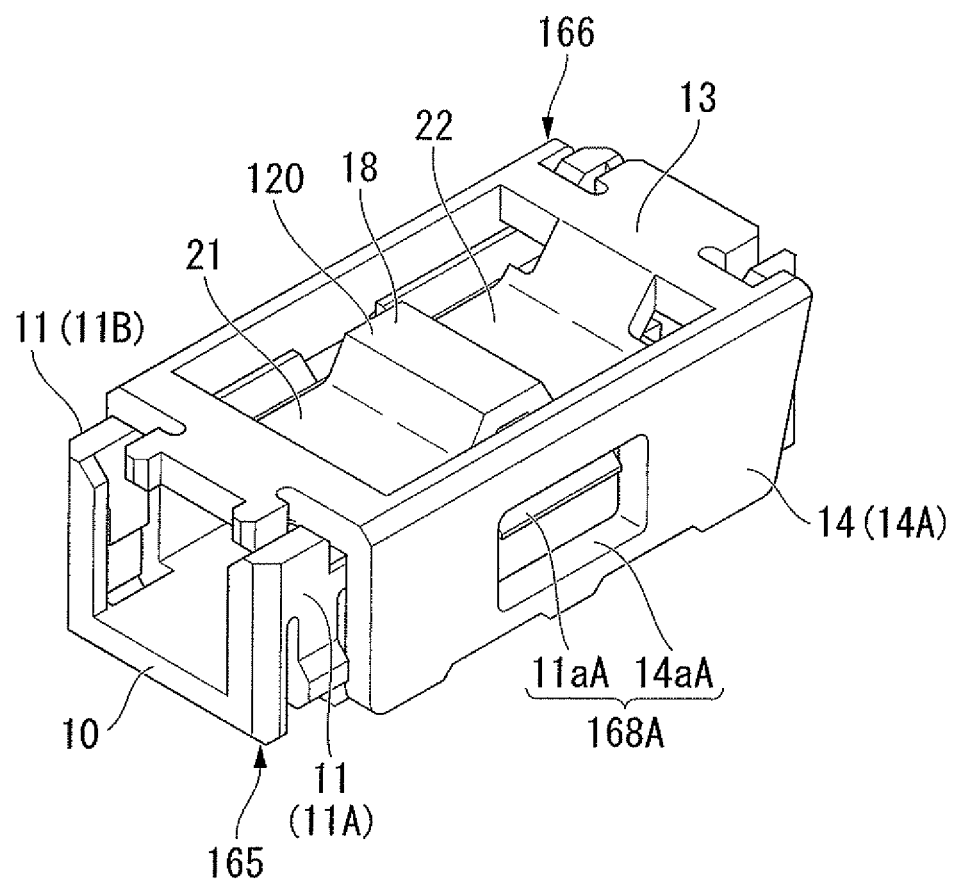
FIG. 46 is a perspective view seen from one side of the holding member main body and the lid body of the optical fiber ribbon holding member according to FIG. 45.
Figure 47:
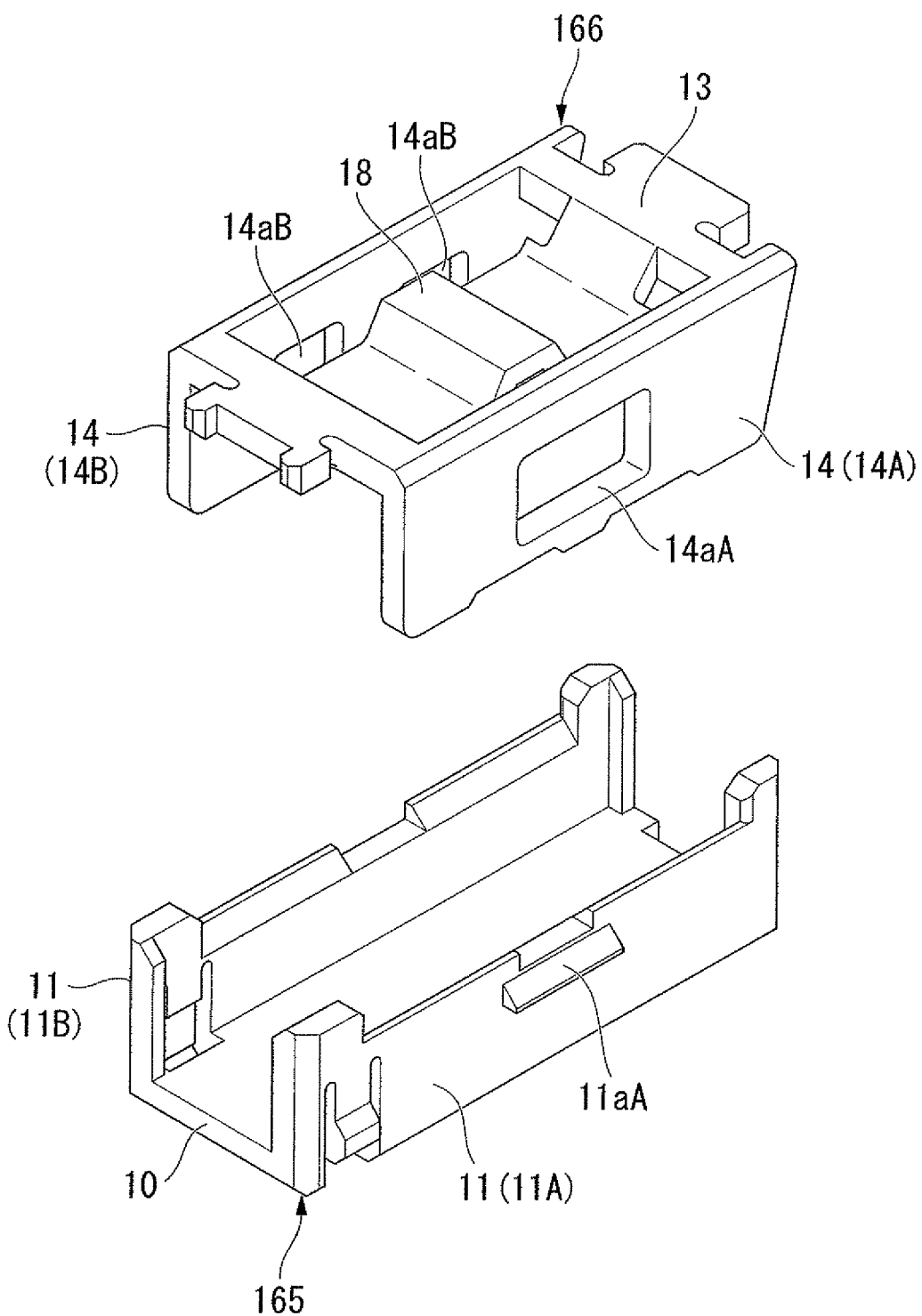
FIG. 47 is a partial perspective view seen from one side of the holding member main body and the lid body of the optical fiber ribbon holding member according to FIG. 45.
Figure 48:
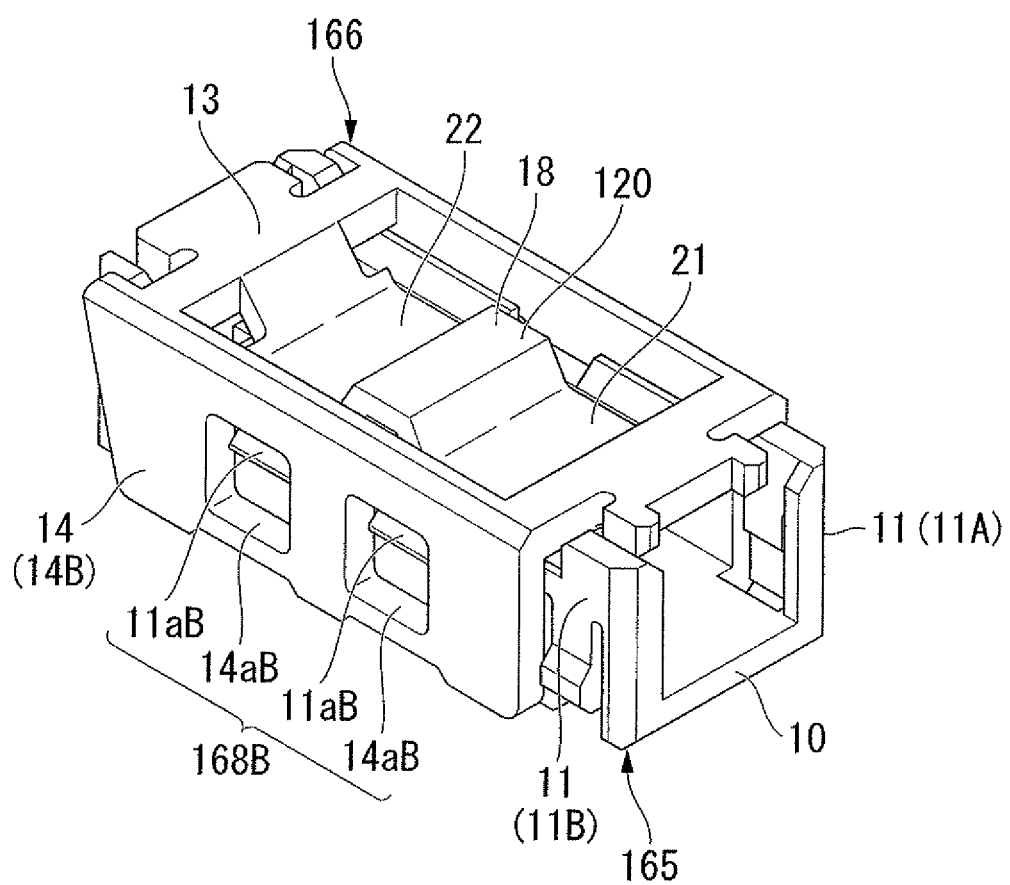
FIG. 48 is a perspective view seen from a second side of the holding member main body and the lid body of the optical fiber ribbon holding member according to FIG. 45.
Figure 49:
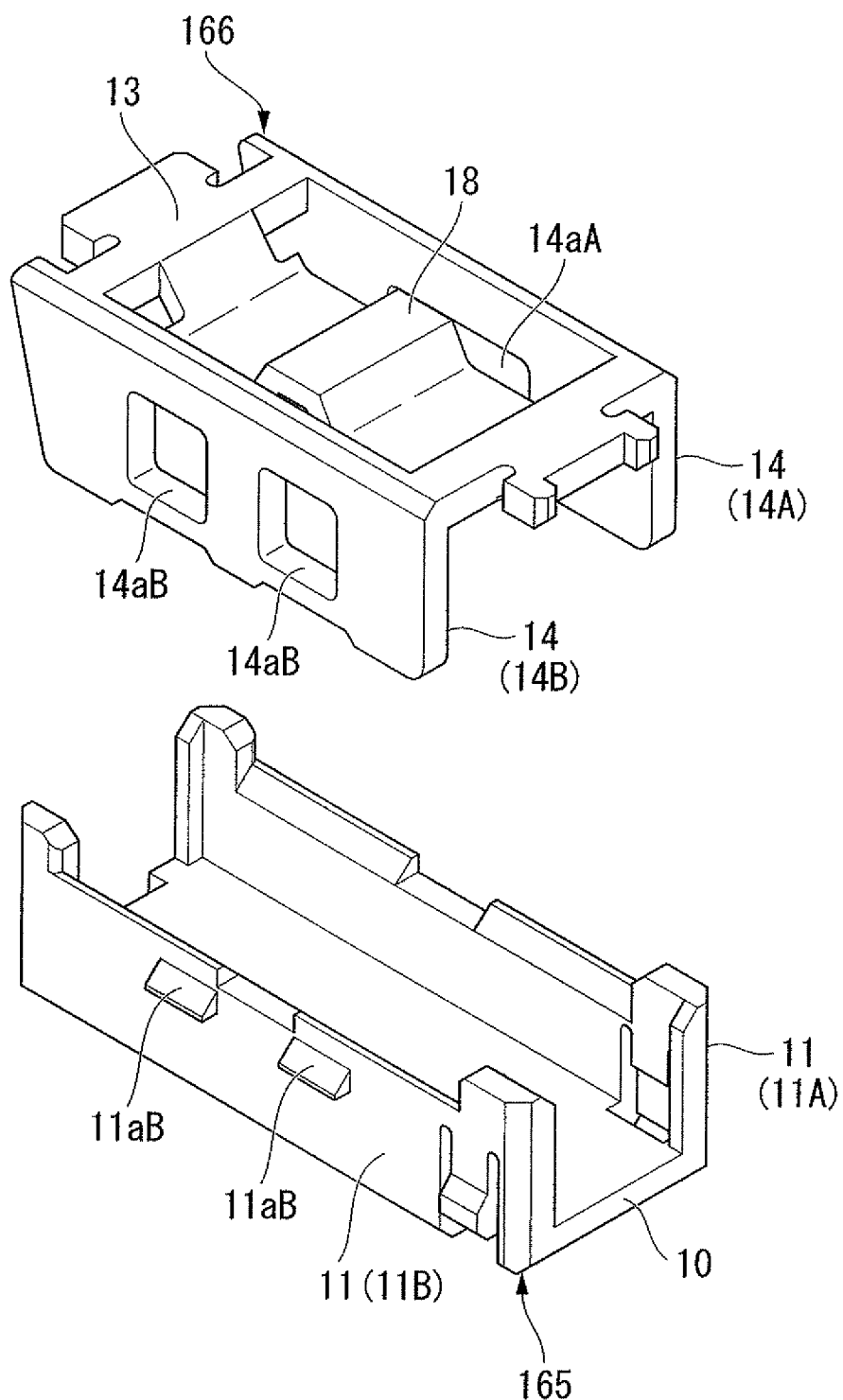
FIG. 49 is a partial perspective view seen from the second side of the holding member main body and the lid body of the optical fiber ribbon holding member according to FIG. 45.
Figure 50:
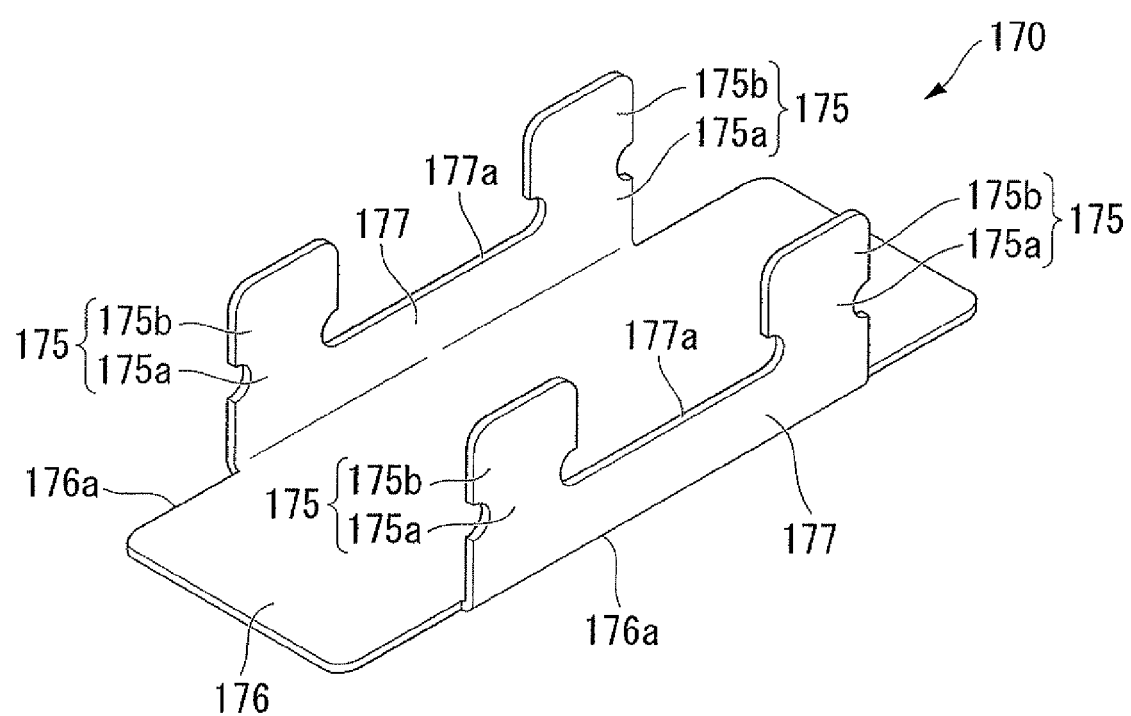
FIG. 50 is a perspective view showing the pressure dispersion plate for the optical fiber ribbon holding member according to FIG. 45.

FIG. 45 to FIG. 50 shows an optical fiber ribbon holding member 161 according to a seventeenth embodiment. FIG. 45 is a perspective view of an optical fiber ribbon holding member 161. FIG. 46 is a perspective view seen from one side of the holding member main body 165 and the lid body 166 that form the optical fiber ribbon holding member 161. FIG. 47 is a partial perspective view seen from one side of the holding member main body 165 and the lid body 166. FIG. 48 is a perspective view seen from the other side of the holding member main body 165 and the lid body 166. FIG. 49 is a partial perspective view holding member main body 165 and the lid body 166. FIG. 50 is a perspective view showing the pressure dispersion plate 170.

As illustrated in FIG. 45, the optical fiber ribbon holding member 161 includes the holding member main body 165, the lid body 166 that covers the holding member main body 165 and a pressure dispersion plate 170 disposed between the optical fiber ribbon 2 and the lid body 166 in the holding member main body 165.

The holding member main body 165 includes the bottom portion 10 and the wall portions 11, 11, provided on both side edges.

The lid portion 166 includes the bottom portion 13 (top surface portion) and the wall portions 14, 14 provided on both side edges.

The optical fiber ribbon holding member 161 includes the first latch structure 168 (refer to FIG. 23), and the optical fiber ribbon holding member 161 differs from the optical fiber ribbon holding member 101 according to the seventh embodiment illustrated in FIG. 18 to FIG. 24B in that the second latch structure 17 (refer to FIG. 24A) is omitted.

As illustrated in FIG. 46 to FIG. 49, the first latch structure 168 includes an engagement structure 168A provided on one side portion of the holding member main body 165 and the lid body 166 (refer to FIG. 46 and FIG. 47) and an engagement structure 168B provided on the other side portion (refer to FIG. 48 and FIG. 49).

As illustrated in FIG. 46 and FIG. 47, the engagement structure 168A includes an engaging click 11aA provided on one wall portion 11 (11A) on the holding member main body 165 and an engaging recess 14aA provided on one wall portion 14 (14A) of the lid body 166. The engaging click 11aA and the engaging recess 14aA illustrated in the figure are formed substantially in the center of the insertion direction of the optical fiber ribbon 2.

As illustrated in FIG. 48 and FIG. 49, the engagement structure 168B includes two engaging clicks 11aB, 11aB provided on the other wall portion 11 (11B) on the holding member main body 165 and two engaging recesses 14aA, 14aA provided on the other wall portion 14 (14B) of the lid body 166. The engaging clicks 11aB, 11aB are formed with an interval with respect to the insertion direction of the optical fiber ribbons 2. The engaging recesses 14aA, 14aA are formed with an interval with respect to the insertion direction of the optical fiber ribbons 2. The engaging click 11aB and the engaging recess 14aB illustrated in the figure are formed at a position from the center slightly towards the end in the insertion direction.

As illustrated in FIG. 45, the engaging click 11aA of the engagement structure 168A is engaged with the engaging recess 14aA, and the engaging clicks 11aB, 11aB of the engagement structure 168B are engaged with the respective engaging recesses 14aB, 14aB. In this configuration, the optical fiber ribbons 2 in the holding member main body 165 are slightly pressed by the pressing portion 18 of the lid body 166. Therefore, in this configuration, it is desirable that positional adjustment of the optical fiber ribbons 2 is possible without the optical fiber ribbons 2 easily changing position.

In the optical fiber ribbon holding member 161, since the mutual positions of the engagement structure 168A, 168B differ, mistaking the orientation of the lid body 166 when mounting the lid body 166 on the holding member main body 165 can be prevented.

As illustrated in FIG. 45 and FIG. 50, the pressure dispersion plate 170 includes a plate-shaped pressure dispersion plate main body 176 that abuts with the optical fiber ribbon 2, a side plate portion 177 that extends in a substantially vertical orientation with respect to the pressure dispersion plate main body 176 from the side edge 176a of the pressure dispersion plate main body 176, and an engaging click 175 formed on the upper edge 177a of the side plate portion 177.

The engaging click 175 includes a base end portion 175a and a main portion 175b that is formed with an increased width from the base end portion 175a.

As illustrated in FIG. 45, the engaging click 175 is engaged with the valley 21, 22 of the pressing portion 18 in a bent configuration on an inner side. Since the base end portion 175a has a narrower width than the main portion 175b, the engaging click 175 can be simply subjected to a bending deformation to the inner side at the base end portion 175a.

In the example illustrated in FIG. 25, the optical fiber ribbon holding member 101 holds four optical fiber ribbons 2, but the number of the optical fiber ribbons 2 may be arbitrarily set. When the number of the optical fiber ribbons 2 is low (when for example there are two optical fiber ribbons 2), the overall thickness dimension of the optical fiber ribbons to be retain is low. In this configuration, the height dimension of the optical fiber ribbon holding member 101 can be reduced by increasing the thickness of the bottom portion 10 of the holding member main body 5 (refer to FIG. 18).

The optical fiber ribbon holding member according to the present invention can also be applied to holding a single optical fiber ribbon.

The optical fiber ribbon holding member according to the present invention is not limited to a component that is fixed to a holding member fixture for fixing a holding member that is fixed to a device base plate.

What is claimed is:

1. An optical fiber ribbon holding member that holds a plurality of optical fiber ribbons, in which an optical connector mounted on a substrate is attached to a distal end of each optical fiber ribbon, in a laminated state and in a state in which a position of an optical connector at a distal end of an optical fiber ribbon is misaligned in a longitudinal direction of a ribbon, and is fixed to a holding member fixture for fixing a holding member that is fixed to a device bedplate on which the substrate is attached, the optical fiber ribbon holding member comprising:

a holding member main body that has an upward U-shaped cross section with a bottom portion and both sides wall portions, and has a space to which a plurality of optical fiber ribbons can be accommodated in a laminated state; and a lid body that has a downward U-shaped cross section with a top surface portion and both sides wall portions, and covers an open surface of the holding member main body having U-shaped cross section; wherein latch structures are provided on the wall portion of the lid body and the wall portion of the holding member main body, and an engaging click and an engaging recess engage to each other when a lid body covers a holding member main body; and the lid body includes an optical fiber ribbon pressing portion that presses the laminated optical fiber ribbons accommodated in the holding member main body.

2. The optical fiber ribbon holding member according to claim 1, wherein the latch structure provided for mutual engaging between the wall portions of the lid body and the wall portions of the holding member main body includes a two step latch structure including a first latch structure that engages the holding member main body and the lid body so that the accommodated optical fiber ribbons are slightly pressed by the optical fiber ribbon pressing portion, and a second latch structure that engages the holding member main body and the lid body so that the accommodated optical fiber ribbons are tightly pressed by the optical fiber ribbon pressing portion.

3. The optical fiber ribbon holding member according to claim 1 or claim 2, wherein the optical fiber ribbon pressing portion is formed from an elastic member provided on the top surface portion of the lid body.

4. The optical fiber ribbon holding member according to claim 1 or claim 2, wherein the optical fiber ribbon pressing portion has a structure in which the top surface portion of the lid body is configured as a plate spring shape.

5. An optical fiber ribbon holding member comprising:

a holding member main body that has an upward U-shaped cross section with a bottom portion and both sides wall portions, and has a space to which an optical fiber ribbon can be accommodated; and a lid body that has a downward U-shaped cross section with a top surface portion and both sides wall portions, and covers an open surface of the holding member main body having U-shaped cross section; wherein latch structures are provided on the wall portion of the lid body and the wall portion of the holding member main body, and an engaging click and an engaging recess engage to each other when a lid body covers a holding member main body; and the lid body includes an optical fiber ribbon pressing portion that presses the optical fiber ribbon accommodated in the holding member main body.

6. An optical fiber ribbon holding method for holding an optical fiber ribbon using the optical fiber ribbon holding member according to claim 1 or claim 5, the method comprising:
  interposing a soft rubber member between a lowermost optical fiber ribbon and a bottom portion of a holding member main body, between an uppermost optical fiber ribbon and a top surface portion of a lid body, and between optical fiber ribbons, when holding an optical fiber ribbon with the optical fiber ribbon holding member.

7. The optical fiber ribbon holding method according to claim 6, wherein
  a rubber tube covers an optical fiber ribbon as the rubber member.

8. An optical fiber ribbon bundle formed from a plurality of optical fiber ribbons, in which each optical fiber ribbon has an optical connector mounted on a distal end thereof, and is held by an optical fiber ribbon holding member according to claim 1 or claim 5.

9. The optical fiber ribbon bundle according to claim 8, wherein
  a soft rubber member is interposed between a lowermost optical fiber ribbon and a bottom portion of the holding member main body, between an uppermost optical fiber ribbon and a top surface portion of a lid body, and between optical fiber ribbons, when holding an optical fiber ribbon with the optical fiber ribbon holding member.

10. The optical fiber ribbon bundle according to claim 9, wherein
  a rubber tube covers an optical fiber ribbon as the rubber member.

11. An optical fiber ribbon holding member comprising:
  a holding member main body having a bottom portion and a wall portions disposed upright from both side edges thereof, and accommodating a plurality of optical fiber ribbons therein;
  a lid body having a bottom portion and a wall portions disposed upright from both side edges thereof, and holding the plurality of optical fiber ribbons with the holding member main body by covering the holding member main body such that inner sides thereof are mutually opposed; and
  a pressure dispersion plate that is disposed between the lid body and the plurality of optical fiber ribbons for dispersing a pressure from the lid body.

12. The optical fiber ribbon holding member according claim 11, wherein
  a limiting structure for limiting mutual relative displacement is provided on at least one of the pressure dispersion plate and the lid body.

13. The optical fiber ribbon holding member according claim 11 or claim 12, wherein
  the pressure dispersion plate is mountable on the lid body.

14. The optical fiber ribbon holding member according claim 12 wherein
  the limiting structure comprises:
  a side plate portion that is disposed upright from both side edges on the pressure dispersion plate; and
  a slit that is provided in the lid body to which the side plate portion of the pressure dispersion plate can be inserted,
  wherein the inserted side plate portion of the pressure dispersion plate brought into contact with an edge of the slit to thereby limit relative displacement between the pressure dispersion plate and the lid body.

15. The optical fiber ribbon holding member according claim 13 wherein
  an engagement portion is provided on the pressure dispersion plate;
  the engagement portion is engaged with the lid body, thereby the pressure dispersion plate can be mounted on the lid body.

16. The optical fiber ribbon holding member according claim 15 wherein
  the engagement portion of the pressure dispersion plate can undergo plastic bending deformation.

17. The optical fiber ribbon holding member according claim 15 wherein
  the engagement portion of the pressure dispersion plate can undergo elastic bending deformation.

18. The optical fiber ribbon holding member according to claim 11 wherein
  the pressure dispersion plate is integrally connected with the lid body.

19. An optical fiber ribbon holding method using an optical fiber ribbon holding member including a holding member main body that has a bottom portion and a wall portions disposed upright from both side edges thereof, and a lid body that has a bottom portion and a wall portions disposed upright from both side edges thereof,
  the method comprising:
  accommodating a plurality of optical fiber ribbons in an inner side of the holding member main body;
  disposing a pressure dispersion plate for dispersing a pressure from the lid body between the lid body and the plurality of optical fiber ribbons; and
  covering the holding member main body with the lid body by mutually opposing an inner sides to thereby hold the plurality of optical fiber ribbons with the holding member main body.

20. The optical fiber ribbon holding method according to claim 19, further comprising: covering each of the plurality of optical fiber ribbons with a rubber tube.

21. The optical fiber ribbon holding method according to claim 20, further comprising: disposing the pressure dispersion plate between an optical fiber ribbon most proximate to the lid body side and a rubber tube covering this optical fiber ribbon.

22. An optical fiber ribbon bundle formed from a plurality of optical fiber ribbons held by an optical fiber ribbon holding member according to claim 11 or claim 18.

* * * * *